United States Patent
Sandoz et al.

(10) Patent No.: US 7,647,415 B1
(45) Date of Patent: Jan. 12, 2010

(54) DYNAMIC WEB SERVICES STACK

(75) Inventors: Paul D. Sandoz, Dublin (IE); Santiago M. Pericas-Geertsen, Milford, NH (US); Kohsuke Kawaguchi, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1391 days.

(21) Appl. No.: 10/787,007

(22) Filed: Feb. 25, 2004

(51) Int. Cl.
    *G06F 15/16* (2006.01)
(52) U.S. Cl. ............................ 709/230; 709/232
(58) Field of Classification Search ............ 709/230, 709/232
    See application file for complete search history.

(56) References Cited

U.S. PATENT DOCUMENTS

| | | | |
|---|---|---|---|
| 5,623,681 A * | 4/1997 | Rivette et al. | 715/255 |
| 6,862,267 B1 * | 3/2005 | Hughes et al. | 370/252 |
| 7,117,504 B2 * | 10/2006 | Smith et al. | 719/328 |
| 7,139,906 B2 * | 11/2006 | Arnfield et al. | 713/1 |
| 7,174,370 B1 * | 2/2007 | Saini et al. | 709/220 |
| 7,356,803 B2 * | 4/2008 | Bau et al. | 717/116 |
| 7,437,710 B2 * | 10/2008 | Bau et al. | 717/117 |
| 2004/0034830 A1 * | 2/2004 | Fuchs et al. | 715/501.1 |
| 2004/0117428 A1 * | 6/2004 | Surma et al. | 709/200 |
| 2004/0117435 A1 * | 6/2004 | Rossmanith et al. | 709/202 |
| 2004/0122735 A1 * | 6/2004 | Meshkin | 705/14 |
| 2004/0168119 A1 * | 8/2004 | Liu et al. | 715/501.1 |
| 2004/0215797 A1 * | 10/2004 | Hadley | 709/230 |
| 2005/0060431 A1 * | 3/2005 | Lewontin | 709/246 |
| 2005/0080930 A1 * | 4/2005 | Joseph | 709/248 |
| 2006/0265689 A1 * | 11/2006 | Kuznetsov et al. | 717/117 |
| 2007/0124362 A1 * | 5/2007 | Kren | 709/202 |

OTHER PUBLICATIONS

Joseph. Developer's introduction to JAX-RPC, part 1. Jan. 11, 2002. IBM.*
Joseph. Developer's introduction to JAX-RPC, part 2. Jan. 1, 2003. IBM.*
Krill. Binary encodings key to proposal. Sep. 19, 2003. Infoworld.*
W3C. Simple Object Access Protocol (SOAP) 1.1. May 8, 2000. W3C.*

(Continued)

*Primary Examiner*—Kenny S Lin
*Assistant Examiner*—Hieu T Hoang
(74) *Attorney, Agent, or Firm*—Robert C. Kowert; Meyertons, Hood, Kivlin, Kowert & Goetzel, P.C.

(57) ABSTRACT

System and method for providing a binary encoding protocol as an alternative to markup language protocols for Web services. Embodiments may provide a Web services stack with a single API that supports a binary encoding protocol in addition to a markup language protocol. Embodiments may dynamically and transparently switch between the markup language protocol and the binary encoding protocol, for example for communications between servers and clients in a Web services network environment. An exemplary markup language is XML. An exemplary binary encoding protocol that may be used is WS-Fast, which may use Abstract Syntax Notation One (ASN.1) and a mapping from XML Schema to ASN.1 for on-the-wire binary messages. Some embodiments may be implemented as a Java Web services stack that implements WS-Fast as an alternative to XML, while still supporting XML and providing one API to both protocols.

70 Claims, 10 Drawing Sheets

OTHER PUBLICATIONS

Bilal Siddiqui, "Introduction to Web Services and WSDL," IBM, Nov. 2001, (6 pages).

"Java Architecture for XML Binding (JAXB)," http://java.sun.com/xml/jaxb, Copyright 1995-2003, (1 page).

"Java API for XML-Based RPC (JAX-RPC)," http://java.sun.com, Copyright 1995-2003, (3 pages).

"Java Web Services Developer Pack 1.3," http://java.sun.com/webservices/webservicespack.html, Copyright 1995-2003, (1 page).

Armstrong et al., "The Java tm Web Services Tutorial," Dec. 17, 2003, (37 pages).

"Introduction to ASN.1," http://asn.1elibel.tm.fr/en/introduction/index.html, Oct. 17, 2003, (6 pages).

"XBIS XML Infoset Encoding," http://xbis.sourceforge.net/index.html, Feb. 14, 2004, (1 page).

"XML Stream (XMLS)," www.sosnoski.com/opensrc/xmls, Feb. 5, 2004, (2 pages).

* cited by examiner

| XML | Fast Schema |
|---|---|
| 25B `<stringT>string</stringT>` | 7B `string` |
| 29B `<integerT>12345678</integerT>` | 4B `12345678` |
| 25B `<booleanT>true</booleanT>` | 1b `true` |

DYNAMIC WEB SERVICES STACK

BACKGROUND OF THE INVENTION

1. Field of the Invention

This invention relates to computer software, and more particularly to communications protocols between Web services on a network.

2. Description of the Related Art

At the heart of Web services is markup language (e.g. XML)-based messaging. The self-describing, redundant nature of markup language protocols such as XML has significant advantages, but they come at a price of bandwidth and performance. Markup language-based (e.g. XML-based) messages may be larger and require more processing that messages in alternative (typically binary) protocols, such as RMI, RMI/IIOP or CORBA/IIOP. In XML and other markup languages, data may be represented inefficiently, and binding typically requires more computation. For example, a Java RMI (Remote Method Invocation) service may perform an order of magnitude more quickly than an equivalent conventional Web service using XML. Although RMI does not use HTTP, this is not a significant factor for XML-based messages when compared to binding. HTTP becomes a more noteworthy factor when a more efficient format is used, which suggests that alternative transports to increase Web services performance may be desirable.

Increased bandwidth affects wire-based networks as well as wireless-based networks. Often, the latter have more restrictions in terms of bandwidth allotted for communication by a network device. In addition, larger messages increase the possibility of retransmission, while the smaller the message, the less likely it will be corrupted when in the air. Increased processing similarly affects the network devices communicating using the two forms of network (wire-based and wireless). A server may not be able to handle the throughput the network demands of it. Mobile phone battery life may be reduced as the device uses more memory and performs more processing. As the scale of Web service usage increases these problems are likely to be exacerbated.

WSDL

The Web Services Description Language (WSDL) is an XML-based language used to describe the services a business offers and to provide a way for individuals and other businesses to access those services electronically. WSDL is the cornerstone of the Universal Description, Discovery, and Integration (UDDI) initiative spearheaded by Microsoft, IBM, and Ariba. UDDI is an XML-based registry which enables businesses to list themselves and their services on the Internet. WSDL is the language used to do this. The following are some aspects of WSDL:

The abstract, which defines the messages, using W3C XML Schema and the port type, containing operations that state what messages may be sent and received.

The binding, which defines how a port type is bound to a protocol and therefore how the messages are encoded on the wire. Thus, a port type may be bound to many types of protocol and encodings thereof. The most common and widely used binding is the SOAP binding, which defines two forms of literal encoding, meaning that the XML schema is used literally to define XML-based content for the body, headers, and faults of the SOAP protocol. The RPC/literal and document/literal encodings are defined. The former allows for zero or more parameters in a SOAP body message, while the latter only allows for zero or one parameter in a SOAP body message.

The service, which attaches one or more bindings to a network address, which are referred to as a ports.

FIG. 1 illustrates the general structure of a WSDL Web services stack. A Web services stack may include an application layer 10, a protocol and data binding layer 12, and a transport layer 14.

Data Compression and Web Services

There are problems with using a data compression algorithm to speed up Web services. Even though it is true that, using some compression algorithms, the message size may be reduced (this is especially true for XML data), this does not necessarily translate into better latency or better throughput. Data compression algorithms tend to be very CPU intensive, and this has a direct impact on roundtrip latency. In addition, once the XML data is uncompressed, it must be parsed and possibly bound to an object model. A significant percentage of the latency time is spent in those two steps. Data compression may be useful for some applications (e.g. those sending data over low-bandwidth lines with a per-byte charge), but its applicability to Web services is limited.

JAX-RPC

JAX-RPC (Java API for XML-Based RPC) is an application program interface (API) in the Java Web Services Developer Pack (WSDP) that enables Java developers to include remote procedure calls (RPCs) with Web services or other Web-based applications. JAX-RPC is aimed at making it easier for applications or Web services to call other applications or Web services. JAX-RPC provides a programming model for the development of SOAP (Simple Object Access Protocol)-based applications. The JAX-RPC programming model simplifies development by abstracting SOAP protocol-level runtime mechanisms and providing mapping services between Java and the Web Services Description Language (WSDL).

JAXB

Java Architecture for XML Binding (JAXB) provides a mechanism to bind an XML schema to a representation in Java code. JAXB provides an API and tools that automate the mapping between XML documents and Java objects. This makes it easy for a developer to incorporate XML data and processing functions in applications based on Java technology without having to know much about XML itself. JAXB simplifies access to an XML document from a Java program by presenting the XML document to the program in a Java format.

SUMMARY

Embodiments of a system and method for providing a binary encoding protocol as an alternative to markup language protocols for Web services are described. Embodiments may provide a Web services stack with a single API that includes a binary encoding protocol runtime as well as a markup language protocol runtime. Embodiments may dynamically and transparently switch between the markup language protocol and the binary encoding protocol, for example for communications between servers and clients in a Web services network environment. An exemplary markup language is XML. An exemplary binary encoding protocol that may be used as an alternative to a markup language protocol is WS-Fast. WS-Fast may use Abstract Syntax Notation One (ASN.1) and a mapping from XML Schema to ASN.1 for on-the-wire binary messages.

Embodiments may provide a faster alternative to markup language protocols (e.g., XML) in the Web services stack by providing a binary encoding protocol as an alternative to markup language protocols on the wire. Embodiments may minimize the developer impact to existing Web Services standards and APIs, while allowing the choice to use either the markup language protocol or the binary encoding protocol using the same API.

Some embodiments may be implemented as a Java Web services stack. In these embodiments, JAX-RPC may support both XML and WS-Fast with one API, and JAXB may support both XML and WS-Fast with one API. The Java Web services stack may implement support for WS-Fast as an alternative to XML, while still supporting XML and minimizing the developer impact by providing one API to both WS-Fast and XML. Embodiments of the Java Web services stack may enable fast and efficient end-to-end Web services for J2MB, J2SE and J2EE platforms and products.

In one embodiment, a Web services stack that supports both the binary encoding protocol and the markup language protocol may connect to another Web services stack on another system that also supports both the binary encoding protocol and the markup language protocol. In one embodiment, the Web services stacks may each support the two protocols using a single API exposed to the developer/application on the respective systems. In one embodiment, the system may be a JAX-RPC client or a J2ME client, and the other system may be a JAX-RPC server, or the system may be a JAX-RPC server and the other system a JAX-RPC client or a J2ME client. In one embodiment, instead of client/server, the two systems may be peers on the network.

The Web services stack may initially communicate with the other Web services stack according to the markup language protocol. The Web services stack may dynamically switch to communicate with the other Web services stack according to the binary encoding protocol. Note that the two Web services stacks may also switch back from the binary encoding protocol to the markup language protocol, or may initially start communicating according to the binary encoding protocol and later switch to the markup language protocol.

A Web services stack on a system that supports both a binary encoding protocol and a markup language protocol may communicate with other systems that support either one of or both of the protocols. In one embodiment, a system with a Web services stack that supports both a binary encoding protocol and a markup language protocol may negotiate with another system to determine if the other system supports the binary encoding protocol. If the negotiation determines that the other system supports the binary encoding protocol, the system may communicate with the other system using the binary encoding protocol. If the negotiation determines that the other system does not support the binary encoding protocol, the system may communicate with the other system using the markup language protocol. Note that, if the other system supports both protocols, then the two systems may communicate using either protocol, and may dynamically and transparently switch between the two protocols as necessary or desired.

Figure 1:
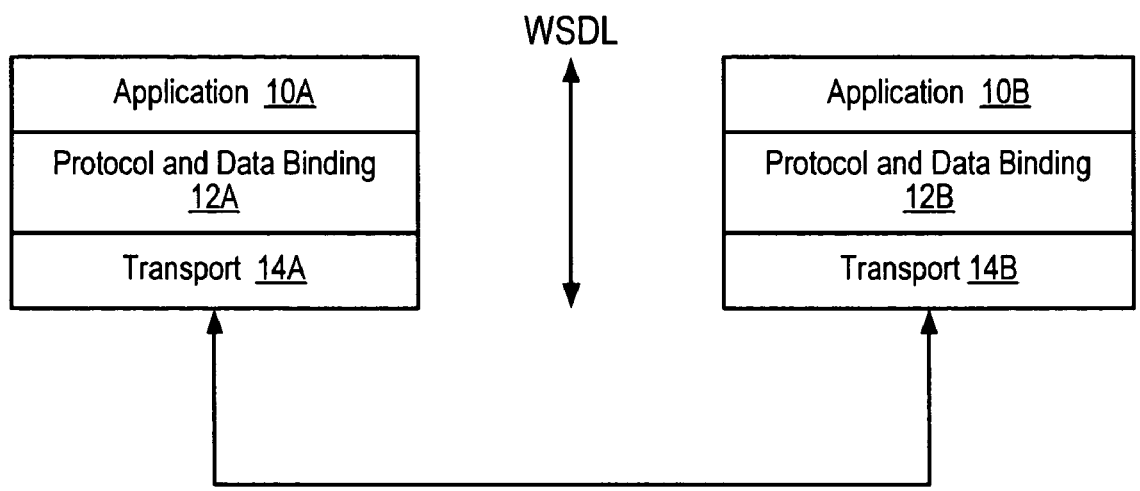
FIG. 1 illustrates the general structure of a WSDL Web services stack.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for providing a binary encoding protocol as an alternative to markup language protocols for Web services are described. Embodiments may provide a Web services stack with a single API that includes a binary encoding protocol runtime as well as a markup language protocol runtime. Embodiments may dynamically and transparently switch between the markup language protocol and the binary encoding protocol, for example for communications between servers and clients in a Web services network environment. An exemplary markup language is XML. An exemplary binary encoding protocol that may be used as an alternative to a markup language protocol is WS-Fast, which may be referred to herein as simply "Fast". WS-Fast may use Abstract Syntax Notation One (ASN.1) and a mapping from XML Schema to ASN.1 for on-the-wire binary messages. Note that, in this document, XML and WS-Fast are used as exemplary markup language and binary encoding protocols, respectively, and other markup languages and/or binary encoding protocols may be used in embodiments. WS-Fast and ASN.1 are further described later in this document.

Embodiments may provide a faster alternative to XML in the Web services stack. By providing a binary representation (e.g., using WS-Fast) as an alternative to XML and SOAP on the wire, it is possible to achieve performance close to or equal that of existing binary protocols. Embodiments may minimize the developer impact to existing Web Services standards and APIs, while allowing the choice to use XML or WS-Fast using the same API. Thus, from the point of view of a developer, one API supports both XML and WS-Fast for Web services.

As an example of the advantages of using a binary representation for messages on the wire between Web service stacks as an alternative to XML, a string "abcdef" may be encoded in XML as:

<stringT>abcdef</stringT> which used 25 Bytes. The same string may be encoded as a binary representation by WS-Fast and ASN.1 using UTF-8 encoding with a length prefix, which uses seven Bytes. As another example, the integer "12345678" may be encoded in XML as:

<integerT>12345678</integerT> which uses 29 Bytes. The same integer may be encoded as a binary representation by WS-Fast and ASN.1 as four Bytes with a length prefix. As yet another example, the Boolean value "true" may be encoded in XML as:

<booleanT>true</booleanT> which uses 25 Bytes. The Boolean value may be encoded as a binary representation with WS-Fast and ASN.1 as one bit since the length is known.

Some embodiments may be implemented as a Java Web services stack. In these embodiments, JAX-RPC may support both XML and WS-Fast with one API, and JAXB may support both XML and WS-Fast with one API. The Java Web services stack may implement support for WS-Fast as an alternative to XML, while still supporting XML and minimizing the developer impact by providing one API to both WS-Fast and XML. Embodiments of the Java Web services stack may enable fast and efficient end-to-end Web services for J2ME, J2SE and J2EE platforms and products. Embodiments of the Java Web services stack may minimize the impact on developers, provide interoperability with existing peers, and may be used as a multi-platform standard.

One embodiment may use existing tools used in processing XML to replace the serialization of XML with alternative formats. One such format is the Fast Infoset format, which is based on the XML Infoset and so is self-describing. Fast Infoset is an alternative binary serialization for XML that replaces the textual serialization with a more efficient binary format. Another such format is the Fast Schema format, a schema-optimized format for transmitting data described by an XML schema. In the Fast Schema format, the XML schema may be used to optimize information during serialization to make the information more compact. The Fast Schema format relies on schema knowledge at sender and receiver to redundant information from messages, leaving the important information in the messages. In one embodiment, these formats may be included in the Web Services developer pack for both JAX-RPC and JAXB to enable Java Web services to use XML or one of the two formats without affecting the API the developer uses for JAXB or JAX-RPC. Note that other embodiments may support other formats.

In one embodiment, JAXB may take XML schema and serialize out to XML or to a Fast format. In one embodiment, JAXB may generate an ASN.1 representation and compile the ASN.1 representation to generate encoders and decoders on the same classes as the XML marshallers and unmarshallers. In this embodiment, JAXB supports XML and Fast marshalling at runtime using the same generated classes. The corresponding XML Schema is converted to an underlying ASN.1 representation, the ASN.1 metadata, which may then be utilized in a number of scenarios. The ASN.1 metadata may be compiled to specific methods on the JAXB object to marshal to an ASN.1 encoding rule, for example PER, or this may be interpreted at runtime with dynamic optimization to an ASN.1 encoding rule. The metadata may also be used for other purposes, for example generating a unique fingerprint of the data types of a message, thus allowing for detection of schema drift.

In one embodiment, JAX-RPC may use JAXB as the framework for processing XML schema and marshalling out to the XML format or the Fast format. In one embodiment, a JAX-RPC implementation may utilize JAXB as the primary schema compiling technology for WSDL defined messages. This allows support for both document literal and RPC literal, where for the latter JAXB is used to generate pseudo types for the request/response messages. JAXB generated code is used to marshal the message data.

In one embodiment, JAX-RPC may support two run-time Web services stacks in a modular fashion. JAX-RPC may be able to communicate using SOAP XML or WS-Fast. Stubs may be generated to support both at runtime; thus, it is possible to dynamically and transparently switch from XML to WS-Fast or vice-versa.

For efficient scalability when marshaling an ASN.1 encoding, generated code or dynamic marshaling process may utilize thread shared buffers, when dealing with arrays of data.

In one embodiment, the JAXB implementation may depend on an efficient ASN.1 PER implementation marshal to the WS-Fast format. As this is at the bottom of the stack, this implementation may be optimized. In one embodiment, three layers may be supported: basic ASN.1 support, array ASN.1 support, and full ASN.1 support. The first two may work in the J2ME environment, as well as the J2SE/EE environment. The third layer may work in J2ME-constrained environments.

Note that, in this document, embodiments of a Java Web services stack that support both XML and WS-Fast (Infoset and Schema formats) are provided as exemplary Web services stacks with a single API that includes a binary encoding protocol runtime as well as a markup language protocol runtime, and are not intended to be limiting. Other embodiments may be similarly implemented with other types of Web services stacks than the Java Web services stack.

FIGS. 2 through 10 illustrate means for a system with a Web services stack to communicate with other systems using either a binary encoding protocol or a markup language protocol using a single API. FIGS. 2 through 10 may also illustrate means for a system with a Web services stack that supports both the markup language protocol and the binary encoding protocol using a single API to negotiate with another system to determine if the other system supports the binary encoding protocol and, if the other system supports the binary encoding protocol, communicate with the other system according to the binary encoding protocol. FIGS. 2 through 10 may also illustrate means for two systems with Web services stacks that support both the markup language protocol and the binary encoding protocol to dynamically and transparently switch between the two protocols during communications.

Figure 2:
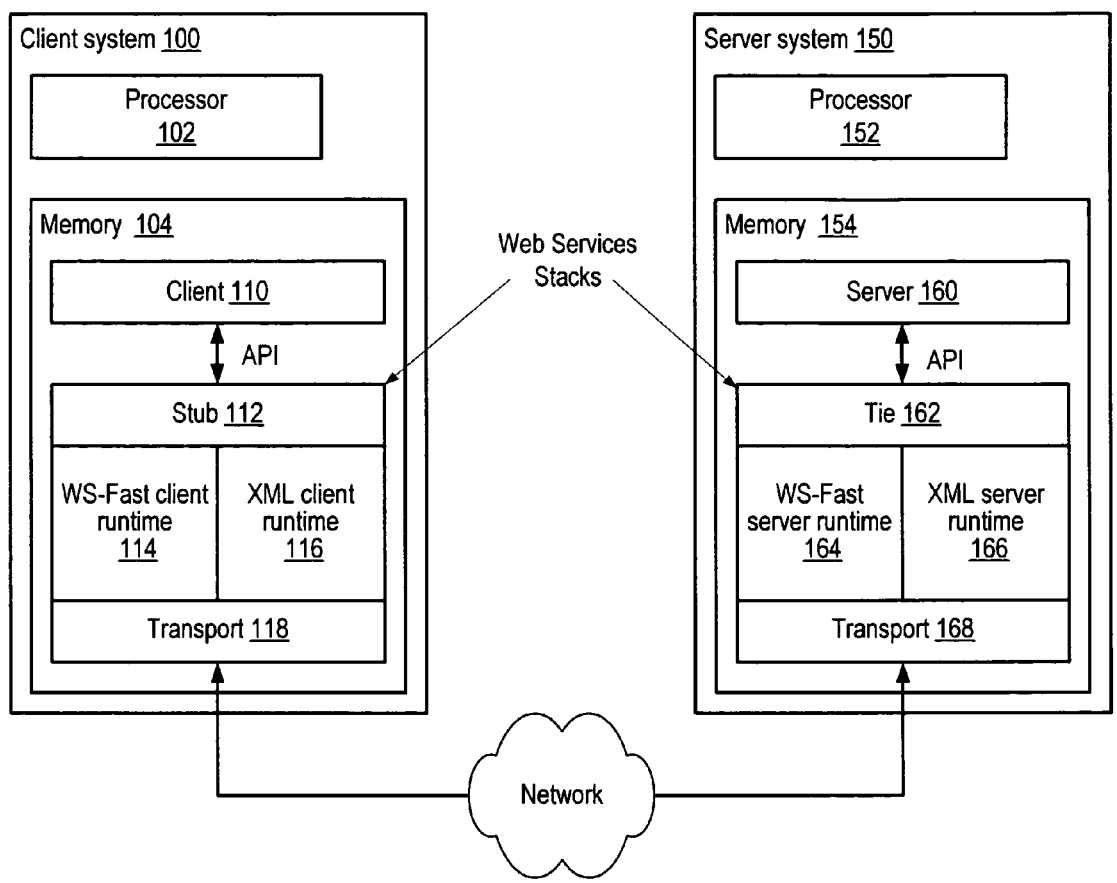
FIG. 2 illustrates a client/server Web services system implementing Web services stacks according to one embodiment.

FIG. 2 illustrates a client/server Web services system implementing Web services stacks that support both the markup language protocol and the binary encoding protocol using a single API according to one embodiment. Client system 100 may be any of various types of devices, including, but not limited to, a personal computer system, desktop computer, laptop or notebook computer, mainframe computer system, workstation, network computer, a consumer device such as a cell phone or PDA, a smart appliance, or in general any type of networkable computing device with a digital heartbeat. Client system 100 may include at least one processor 102. The processor 102 may be coupled to a memory 104. Memory 104 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Client system 100 may couple over a network to one or more other devices via one or more wired or wireless network interfaces, such as server system 150. Client system 100 may include, in memory 104, a client 110 and a client Web services stack.

Server system 150 may be any of various types of devices, including, but not limited to, a personal computer system, desktop computer, laptop or notebook computer, mainframe computer system, workstation, network computer, a consumer device such as a cell phone or PDA, a smart appliance, or in general any type of networkable computing device with a digital heartbeat. Server system 150 may include at least one processor 152. The processor 152 may be coupled to a memory 154. Memory 154 is representative of various types of possible memory media, as described above. Server system 150 may couple over a network to one or more other devices via one or more wired or wireless network interfaces, such as client system 100. Server system 150 may include, in memory 154, a server 160 and a server Web services stack. The server 160 and server Web services stack may be considered, as a whole, a Web service.

In one embodiment, client 110 and server 160 may be developed using one API, which in turn uses one stub 112 and one tie 162, respectively. The stub 112 and tie 162 may be used dynamically with a WS-Fast runtime protocol (WS-Fast client runtime 114 for the client; WS-Fast server runtime 164 for the server) or XML runtime protocol (XML client runtime 116 for the client; XML server runtime 166 for the server), and each runtime protocol may be used dynamically with a chosen transport 118. Thus, the Web service may switch dynamically from XML to WS-Fast and vice versa.

Embodiments of the Web services stack may be modular, as illustrated in FIG. 2. Through modularization of the Web services stack, for example, literal encoding may be separate from SOAP encoding, and the SOAP 1.1 protocol may be separate from the SOAP 1.2 protocol. Modular design may also enable optimal selection of transports, protocols, and encoding formats as they progress or as new ones are developed. The modular design may additionally enable clients and services to exploit new forms of transport and backend dispatch mechanisms; for example, clients may use the Java Messaging API and invoke methods of enterprise message beans.

Figure 3:
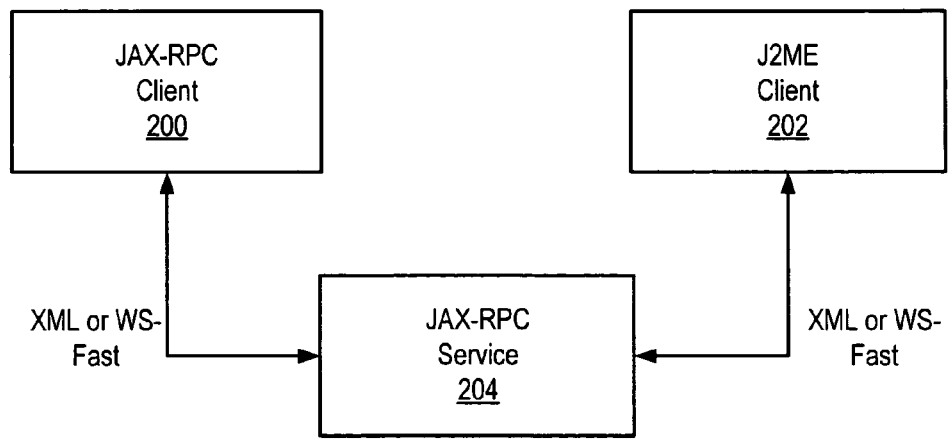
FIG. 3 illustrates JAX-RPC and J2ME Web service clients communicating to the same JAX-RPC service according to one embodiment.

FIG. 3 illustrates JAX-RPC and J2ME Web service clients communicating to the same JAX-RPC service according to one embodiment. In FIG. 2, for example, the server and server Web services stack may be considered, as a whole, a Web service, and may be implemented as a JAX-RPC service that may support both JAX-RPC and J2ME clients. JAX-RPC Service 204 may communicate with both clients (JAX-RPC client 200 and J2ME client 202) using either XML or WS-Fast using a Web services stack such as that illustrated for Server System 150 of FIG. 2.

In this embodiment, the Web service may use WS-Fast to communicate with JAX-RPC client 200 (using JSR 101) and J2ME client 202 (using JSR 172, or J2ME Web services). Thus, the clients may communicate with the same Web service, for example, with a JAX-RPC-based service such as JAX-RPC Service 204, and may communicate with the Web service using either WS-Fast or XML using the same API.

JSR 172 is a subset of JSR 101, which defines only the client. JSR 172 is designed so that a client Web services stack such as that depicted in FIG. 2 can be supported, and thus a stub can support WS-Fast and XML using an HTTP transport.

In one embodiment, support for at least a limited feature set of W3C's XML schema specification allows for efficient WS-Fast support, because the XML schema may be mapped to ASN.1 without having to generate specific encoders and decoders for WSDL defined messages. In one embodiment, this enables the encoding and decoding to be placed in the client runtime (e.g. WS-Fast client runtime 114 of FIG. 2) as opposed to the stub, allowing for lighter stubs, which is important because the client will download these aspects.

Compiling WSDL messages and encoding and decoding instances may represent the largest portion of a Web services stack. In one embodiment, JAXB may be used to support compiling the XML schema into Java types that may be used to encode to and from WS-Fast and to serialize to and from XML. Using JAXB for both WS-Fast and XML may help in providing a modular Web services stack. In one embodiment, JAX-RPC may use its own binding technology because it needs to support SOAP encoding. In other embodiments, other schema technology such as RELAX-NG may be used.

Figure 4:
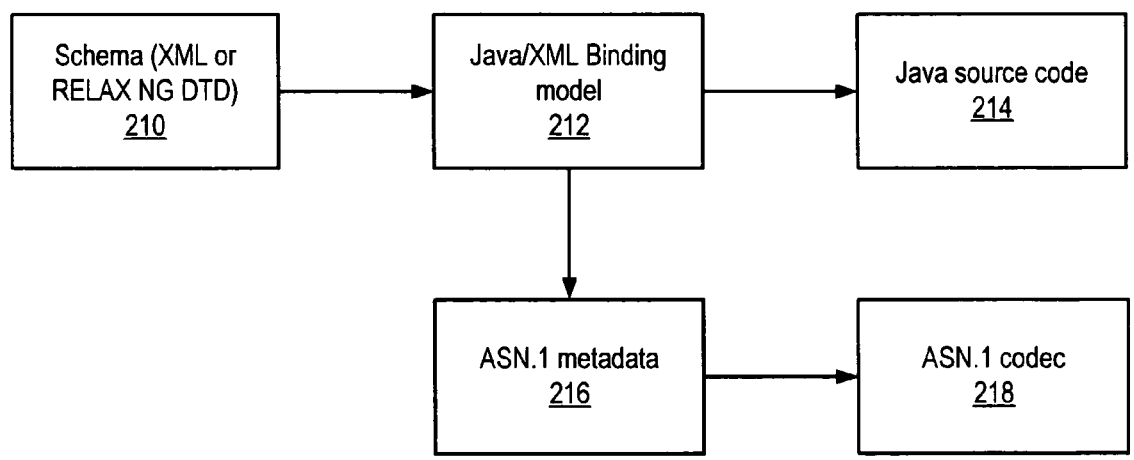
FIG. 4 illustrates how JAXB works with WS-Fast and XML according to one embodiment.

FIG. 4 illustrates how JAXB works with WS-Fast and XML according to one embodiment. A schema 210, for example an XML schema or a RELAX NG schema, may be compiled into Java source code 214 using the JAXB Java/XML binding model 212. The JAXB Java/XML binding model 212 may also be used to generate ASN.1 metadata 216 from the schema 210. ASN.1 metadata 216, which may be defined as XML, may then be used to generate an ASN.1 codec 218, which is code specific to encoding and decoding to and from the WS-Fast format.

Using JAXB to generate the ASN.1 metadata 216, as illustrated in FIG. 4, allows for different ways of encoding and decoding ASN.1-based information. For example, codecs or specific static code may be generated. Alternatively, it is possible to operate on the ASN.1 metadata 216 at runtime. Additionally the ASN.1 metadata 216 may be used for other purposes such as generating a WSDL message fingerprint.

Figure 5:
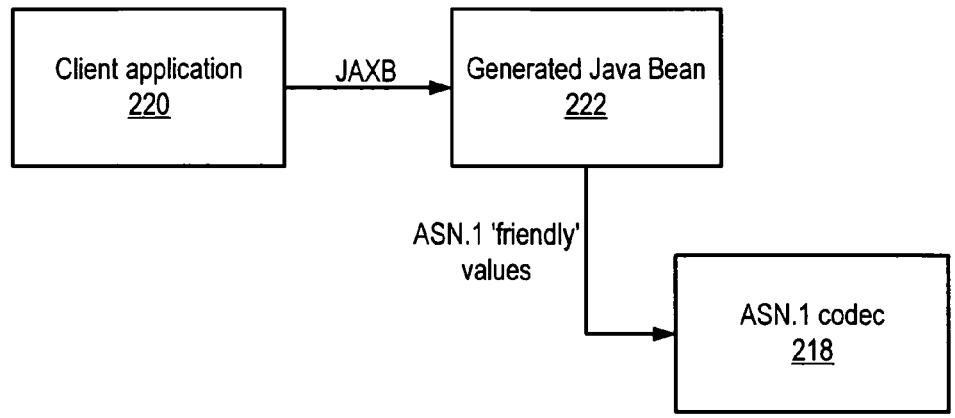
FIG. 5 illustrates JAXB extension to generated code according to one embodiment.

FIG. 5 illustrates JAXB extension to generated code according to one embodiment. A client application 220, as depicted in FIG. 5, may use the JAXB-generated Java Bean 222, which in turn will use the ASN.1 codec 218 generated in FIG. 4. The Java Bean 222 and the ASN.1 codec 218 may interact using "ASN.1-friendly" values that are suited to the ASN.1 codec 218 and the runtime it depends on.

Web service client and service developers can use JAX-RPC to hide XML for input and output message parameters. In one embodiment, this may also be allowed for well-defined header parameters that need to be understood by the set of roles of which a header consumer is a member. For application-defined headers, this may be done in the WSDL document. For generic headers, there may need to be some distinction, and underlying mechanisms where it is not avoidable may need to be allowed for. This form of header processing may be invariant for a large set of applications. Thus, supporting WS-Fast and XML differently by accessing the underlying messages may not have much impact to the majority of Web service developers. For header processing that does not require XML infoset inspection of the message, binding the header types may be easier for the developer. Two examples that fit this model are the WS-Reliability specification and the ebXML messaging specification, both of which define a set of SOAP headers for the reliable sending and receiving of SOAP messages.

Figure 6:
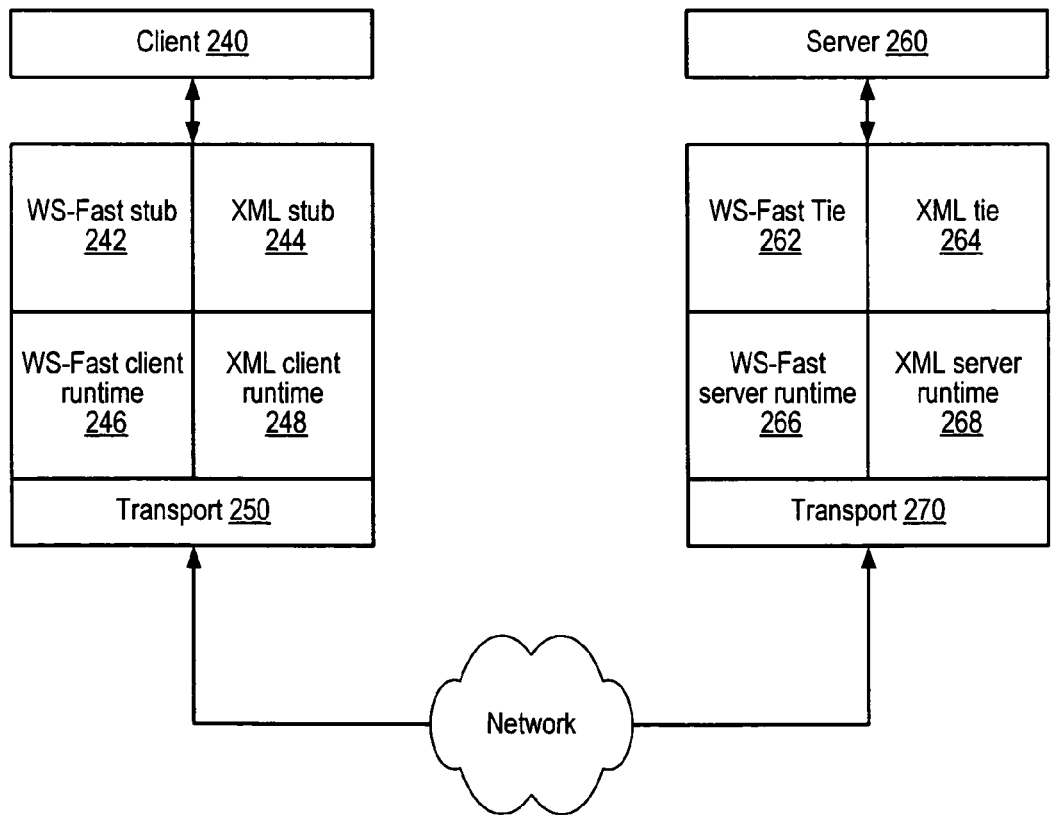
FIG. 6 illustrates an exemplary JAX-RPC client and service with two runtime stacks and separate WSDL-generated code for each binding according to one embodiment.

FIG. 6 illustrates an exemplary JAX-RPC client and service with two runtime stacks and separate WSDL-generated code for each binding according to one embodiment. The WS-Fast stub 242 and WS-Fast tie 262 that are generated may depend on JAXB-generated Java code, and therefore the API to the client and server may be different from the JAX-RPC API defined in JSR 101. As a result, in this embodiment, there may be two separate, isolated stacks that can share the same transport.

In one embodiment, a separate WSDL compiler that utilizes the JAX-RPC WSDL model may generate code using the JAXB code model. The compiler may support both document/literal and RPC/literal. For RPC/literal, a pseudo schema may be generated.

In one embodiment, JAXB types may be connected to the JAX-RPC API using the javax.xml.RPC.encoding package, and a framework specific to WS-Fast. Thus, the JAX-RPC-RI type mapping implementations of the TypeMapping and TypeMappingRegistry may be reused.

In general, the WS-Fast-generated and runtime implementation mirrors the JAX-RPC Reference Implementation (RI) pattern so that developers familiar with the RI may find it easier to understand WS-Fast and its requirements and to reuse a proven framework.

Referring again to FIG. 4, in one embodiment, for WS-Fast code generation in JAXB, static generation of codecs 218 may be used. Other embodiments may use other methods to generate codecs 218. In on embodiment, once the ASN.1 metadata 216 has been generated from the JAXB Java/XML binding model 212, the metadata 216 may be passed as input to a Codec Compiler. Given that the metadata 216 is represented in XML, the Codec Compiler may be implemented using XSLT. For each implementation class generated by JAXB (i.e., for each xs:complexType if the input is a W3C XML schema), an inner class with the following exemplary structure may be generated:

```
class ASN1Codec implements com.sun.xml.bind.asn.Codec {
    public void encode(com.sun.ws.fasttrack.codec.PEREncoder encoder)
        throws java.io.IOException
    {
        // Use low-level PER encoder
    }
    public void decode(com.sun.ws.fasttrack.codec.PERDecoder decoder)
        throws java.io.IOException
    {
        // Use low-level PER decoder
    }
}
```

As an inner class, ASN1Codec may have access to all of the instance variables defined in the enclosing complex type class. However, instead of accessing these variables directly, in one embodiment the JAXB compiler may provide ASN.1 accessor methods. These accessor methods may come in different groups including, but not limited to: getters, setters, and hassers. The term "hasser" refers to the capability of querying an object to see if it "has" a certain property. Getters and setters are used to get and set property values in objects, while hassers are used to check if a property exists in an object. Getters and hassers may be used during encoding (e.g. an encode( ) method) while setters may be used during decoding (e.g. a decode( ) method).

Programs written in XSLT (a.k.a. stylesheets) are essentially stateless. However, using the so-called "modes," a form of controlled state is available. In one embodiment, XSLT modes may be used to generate an encoder and a decoder from the same metadata 216. That is, encoders and decoders may be generated in two separate passes using different modes. Each pass may have, in turn, several sub-passes (typically on a subset of the metadata), which may be necessary to compile features like optional fields or choices. In one embodiment, XSLT modes may be used to define these additional sub-passes.

In addition to the encode( ) and decodes methods, the ASN1Codec class may also define an instance variable for each component of array type defined in the outer class. These instance variables may be used as buffers between the upper layer (i.e., the JAXB accessor methods) and the lower layer (i.e., the PER codecs). Even though these buffers are of a fixed size, they may be resized by either an accessor method (at encoding time) or a PER codec method (at decoding time). For example, the following is exemplary code generated by a Codec Compiler to encode an array of Boolean values:

```
    int         _VarBooleanBufferLength=asnLengthOfVarBoolean( );
    _VarBooleanBuffer=asnGetVarBoolean(_VarBooleanBuffer);
    encoder.startSequenceOf(
    _VarBooleanBufferLength,
    1,
    Integer.MAX_VALUE);
    encoder.boolArray(_VarBooleanBuffer,    _VarBooleanBufferLength);
    encoder.endSequenceOf( );
``` where _VarBooleanBuffer is defined as:
    boolean[ ] _VarBooleanBuffer=new boolean[8];

The method asnGetVarBoolean( ) takes and returns a reference to array of Boolean values. A reference to a freshly allocated array may be returned whenever the length of the input array is too short. Alternatively, other buffering scenarios may be used. For example, in one embodiment, buffers may be separated from the type instance because these are temporary data structures required for encoding and decoding. One embodiment may allow codecs to utilize a buffer manager that stores weak references to arrays of data to allow for better memory utilization, especially in the case of an application server where many JAXB Java class instances may be used in a multiple threads, and one buffer manager may exist for each thread to avoid the cost of synchronization overhead.

One embodiment may provide ASN.1 PER codecs for J2SE and J2ME, where the former may be used by the JAXB ASN.1 generated codecs (e.g. ASN.1 codec 218 of FIG. 4), and the latter may be used by the JSR 172 runtime. In one embodiment, three layers of functionality may be defined for the ASN.1 PER codecs:

Basic PER: support for all structures and datatypes required by JSR 172. To encode/decode an array of length N using these codecs, O(N) method invocations are required.

Array PER: everything in Basic PER plus primitive support for arrays of datatypes. Using these codecs, it is possible to encode/decode an array using O(1) method invocations.

Full PER: everything in Array PER plus support for all structures and datatypes required by JSR 101.

Basic PER and Array PER are compatible with J2ME and J2SE, while Full PER is compatible with J2SE. Basic PER may be used, for example, in resource-constrained J2ME configurations.

Processing time for data in a Web services stack may be divided into layers. In one embodiment, the layers may include:

Transport layer: the time to transmit the message (e.g. using the HTTP protocol) and dispatch to the deployed servlet (e.g. in Tomcat).

Protocol layer: the time to process the SOAP envelope according to the SOAP protocol.

Application layer: the time to process the SOAP body content, namely to encode and decode.

As the number of data elements increases, the processing in the application layer gets larger when compared to the transport and protocol layers. As the data gets larger, the speed-up factor tends toward that of the application layer. Thus, for example, when there are 500 elements, WS-Fast performance may be approximately ten times that of XML literal. Thus, WS-Fast may perform even better in comparison to XML as the size of the content increases. The size of the WS-Fast-encoded SOAP envelope is approximately a fifth of the XML-encoded SOAP envelope. For example, for 500 data elements, WS-Fast may be 11544 bytes, and XML 51406 bytes.

Figure 7:
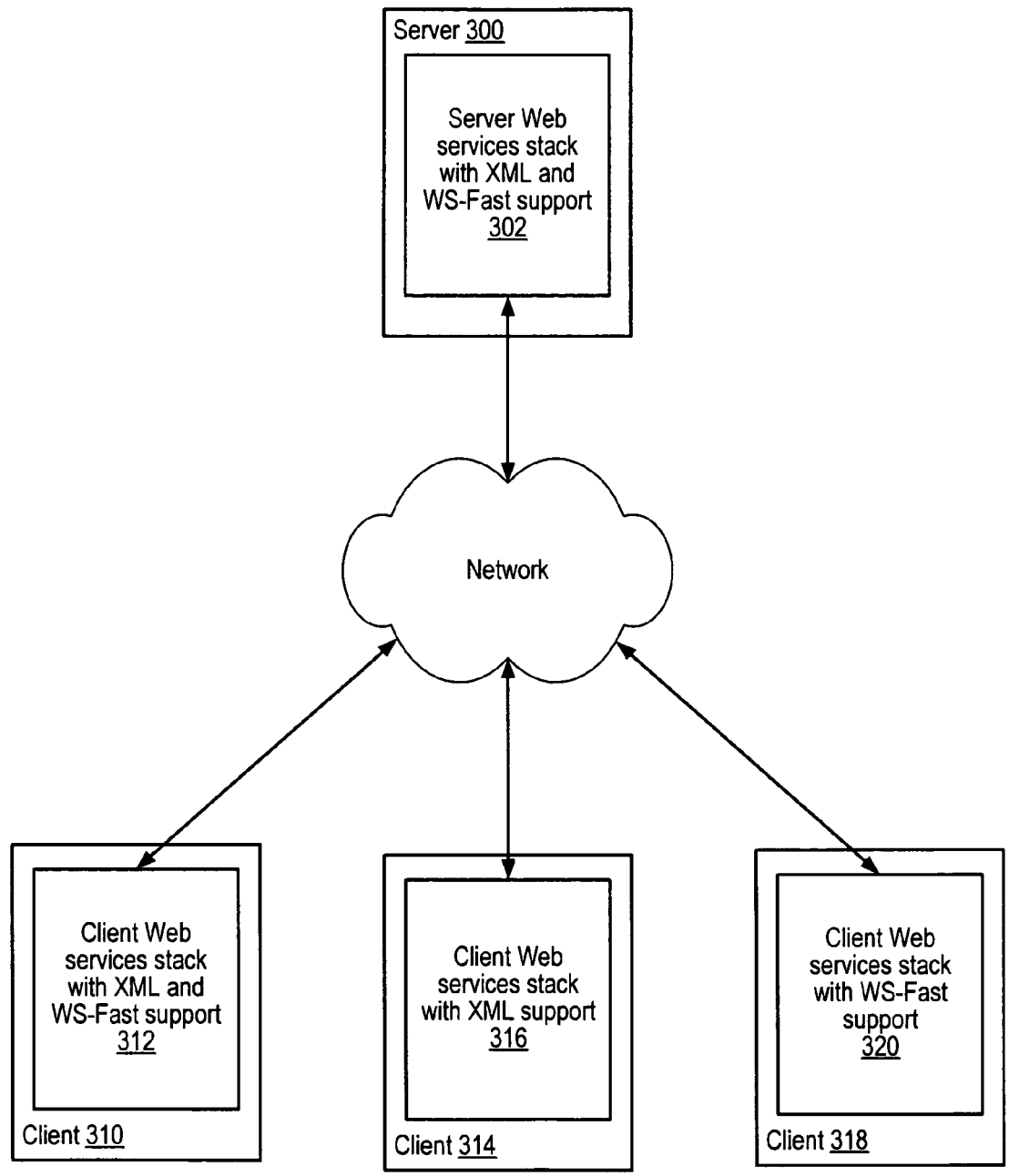
FIG. 7 illustrates an exemplary network with a server implementing a WS-Fast-enabled Web services stack according to one embodiment.

FIG. 7 illustrates an exemplary network with a server implementing a WS-Fast-enabled Web services stack according to one embodiment. Server 300 includes an instance of a server WS-Fast-enabled Web services stack 302 that supports communication on the network using both XML and WS-Fast. Three clients are shown. Client 310 includes an instance of a client WS-Fast-enabled Web services stack 314 that supports communication on the network using both XML and WS-Fast. Client 314 includes a client Web services stack 316 that only supports XML communications. Client 316 includes a client Web services stack that only supports WS-Fast communications. For example, client 316 may be a thin client such as a mobile phone or other device with limited resources and processing power that supports the WS-Fast/PER protocol.

Server 300 may communicate with client 310 using either XML or WS-Fast, and can dynamically and transparently switch between the two protocols when communicating with client 310 if necessary or desired. Server 300 may communicate with client 314 only using the XML protocol. Server 300 may communicate with client 318 only using the WS-Fast protocol. Thus, while allowing a server to communicate with some clients using either XML or WS-Fast, and allowing the server to dynamically and transparently switch between the two protocols, the WS-Fast-enabled Web services stack also allows a server to communicate with clients that only support one of the two protocols.

Figure 8:
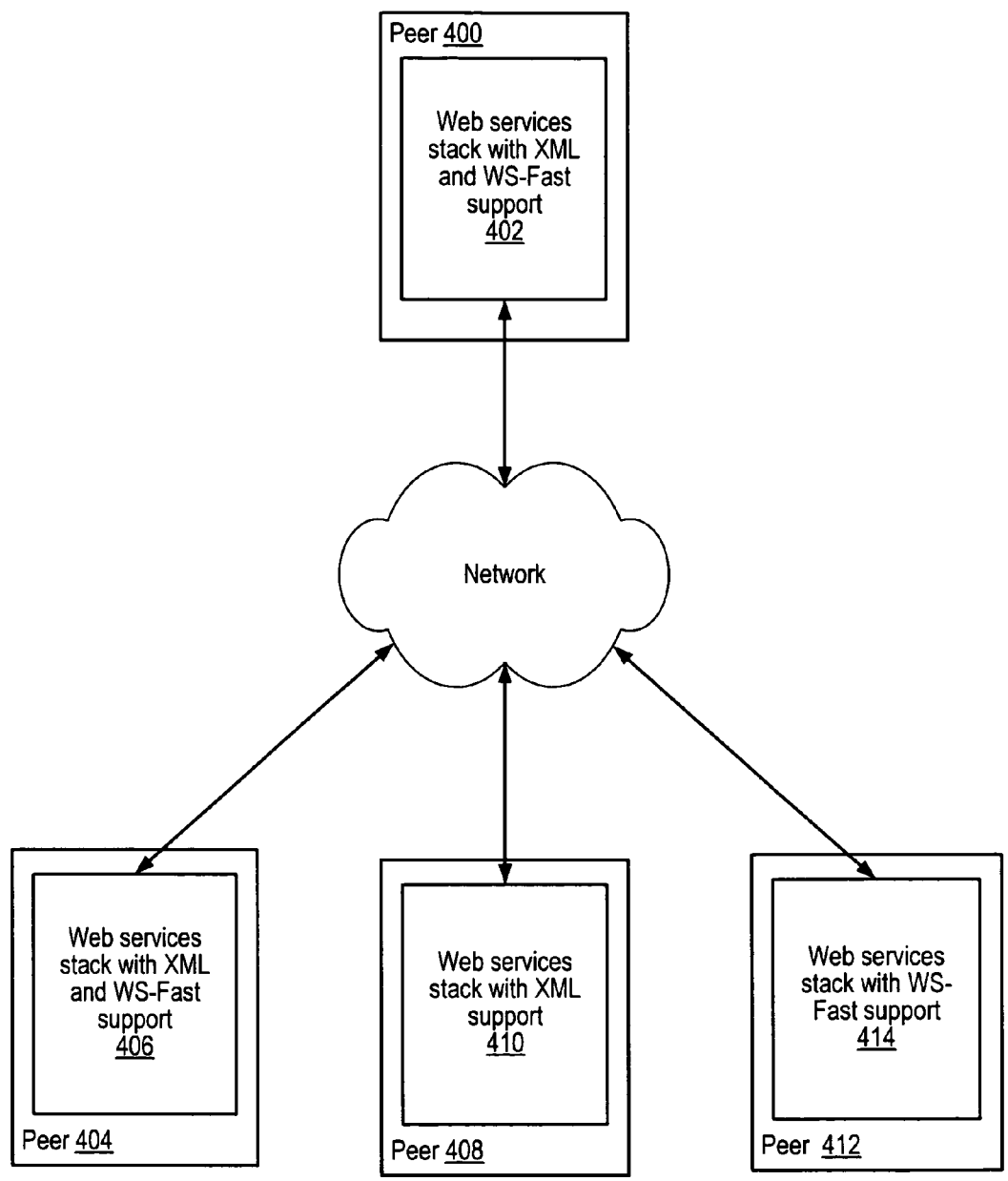
FIG. 8 illustrates an exemplary network with at least some peers implementing a WS-Fast-enabled Web services stack according to one embodiment.

While generally described herein in client/server systems, embodiments of the WS-Fast-enabled Web services stack may also be used in other systems and environments, for example in peer systems. FIG. 8 illustrates an exemplary network with at least some peers implementing a WS-Fast-enabled Web services stack according to one embodiment. In this example, peers 400 and 404 both include an instance of a WS-Fast-enabled Web services stack (402 and 406, respectively) that supports communication on the network using both XML and WS-Fast. Peer 408 includes a Web services stack 410 that only supports XML communications. Peer 412 includes a Web services stack that only supports WS-Fast communications. For example, peer 412 may be a thin client such as a mobile phone or other device with limited resources and processing power that supports the WS-Fast/PER protocol.

Peers 400 and 404 may communicate using either XML or WS-Fast, and can dynamically and transparently switch between the two protocols when communicating if necessary or desired. Peers 400 and 404 may communicate with peer 408 only using the XML protocol. Peers 400 and 404 may communicate with peer 412 only using the WS-Fast protocol. Thus, while allowing a peer to communicate with another peer using either XML or WS-Fast, and allowing the peers to dynamically and transparently switch between the two protocols, the WS-Fast-enabled Web services stack also allows peers to communicate with other peers that only support one of the two protocols.

Figure 9:
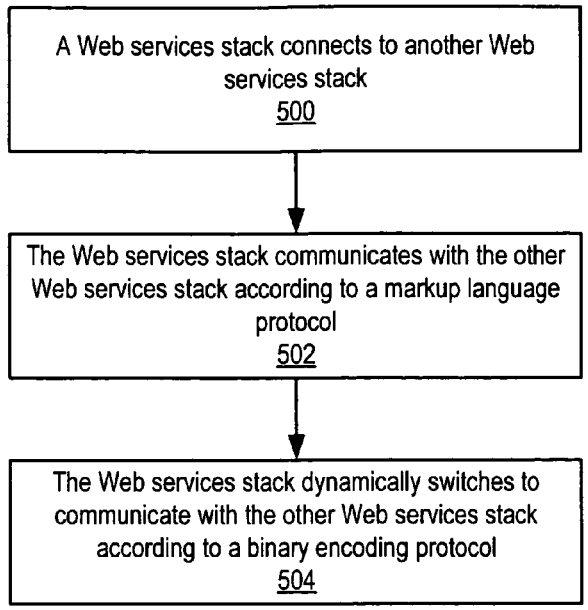
FIG. 9 is a flowchart of operations of a Web services stack on a system that supports both a binary encoding protocol and a markup language protocol according to one embodiment.

FIG. 9 is a flowchart of operations of a Web services stack on a system that supports both a binary encoding protocol and a markup language protocol according to one embodiment. In one embodiment, the markup language protocol may be XML. In one embodiment, the binary encoding protocol may be WS-Fast. In one embodiment, the binary encoding protocol may use Packed Encoding Rules (PER) encoding on the wire.

As indicated at 500, the Web services stack may connect to another Web services stack on another system that also supports both the binary encoding protocol and the markup language protocol. In one embodiment, the Web services stacks may each support the two protocols using a single API exposed to the developer/application on the respective systems. In one embodiment, the system may be a JAX-RPC client or a J2ME client, and the other system may be a JAX-RPC server, or the system may be a JAX-RPC server and the other system a JAX-RPC client or a J2ME client. In one embodiment, instead of client/server, the systems may be peers on the network.

As indicated at 502, the two Web services stacks may initially communicate according to the markup language protocol. As indicated at 504, the Web services stack may at some point dynamically switch to communicate with the other Web services stack according to the binary encoding protocol. Note that the two Web services stacks may also switch back from the binary encoding protocol to the markup language protocol, or may initially start communicating according to the binary encoding protocol and later switch to the markup language protocol.

Figure 10:
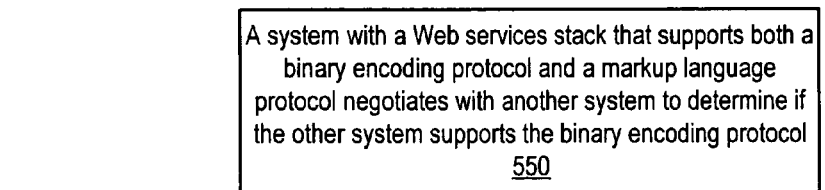
FIG. 10 is a flowchart of a Web services stack on a system that supports both a binary encoding protocol and a markup language protocol negotiating with another system to use one of the two protocols according to one embodiment.

FIG. 10 is a flowchart of a Web services stack on a system that supports both a binary encoding protocol and a markup language protocol negotiating with another system to use one of the two protocols according to one embodiment. In one embodiment, the markup language protocol may be XML. In one embodiment, the binary encoding protocol may be WS-Fast. In one embodiment, the binary encoding protocol may use Packed Encoding Rules (PER) encoding on the wire. In one embodiment, the Web services stack may support the two protocols using a single API exposed to the developer/application on the system.

As indicated at 550, a system with a Web services stack that supports both a binary encoding protocol and a markup language protocol may negotiate with another system to determine if the other system supports the binary encoding protocol. Several methods of content negotiation that may be used to determine if the other system supports the binary encoding protocol are described below. At 552, if the negotiation determines that the other system supports the binary encoding protocol, the system may communicate with the other system using the binary encoding protocol as indicated at 554. If the negotiation determines that the other system does not support the binary encoding protocol, the system may communicate with the other system using the markup language protocol as indicated at 556. Note that, if the other system supports both protocols, then the two systems may communicate using either protocol, and may dynamically and transparently switch between the two protocols as necessary or desired.

In FIGS. 9 and 10, different methods may be used to determine if another system supports WS-Fast. In one embodiment, annotations in the service description (e.g. WSDL) may be used to determine if another system supports WS-Fast. In one embodiment, content negotiation may be used to determine if another system supports WS-Fast. Content negotiation is further described below.

Content Negotiation

In embodiments, content negotiation, which may be referred to simply as negotiation, may be used to enable WS-Fast-enabled Web service systems (e.g. client/servers or peers) to communicate by sending WS-Fast-enabled messages. Content negotiation may be used, for example, to enable optimal communication in environments populated by WS-Fast-enabled Web services where the service descriptions (e.g. WSDL) do not contain annotations stating WS-Fast-enabled capability. The following are three methods of negotiation that may be used in embodiments. Note that other methods of negotiation than those described here may be used in some embodiments:

1) Content negotiation on a first request. The sender assumes that the receiver can understand WS-Fast messages. Either a WS-Fast message in reply or an error will occur. If the latter, then an equivalent XML message may be re-sent so that interoperation can be achieved.

2) Content negotiation on a first response. The sender sends an XML message with meta-hints (in the underlying protocol being used) that state it also supports WS-Fast-enabled web services. If the receiver supports WS-Fast-enabled web services, it can return a WS-Fast message; otherwise an XML message will be returned. If an XML message is returned, then method 1) may be tried on the next request.

3) Content negotiation on a second request. The sender sends an XML message and receives an XML message in reply that also contains meta-information (in the underlying protocol that is being used) that states the receiver is a WS-Fast-enabled Web service. If meta-information is provided, then 1) can be tried on the next request with the knowledge that there should not be an error. If no meta-information pertaining to WS-Fast web service capability is received, then methods 2) or 1) may be tried on the next request.

Note that content negotiation is transparent to the developer. The application of the methods of content negotiation described above is an internal mechanism. In one embodiment, content negotiation may be realized using the HTTP protocol.

Use Cases

The following are some exemplary possible use cases for a Web services stack that dynamically and transparently supports both a markup language protocol (e.g. XML) and a binary encoding protocol (e.g. WS-Fast). Note that these exemplary use cases are not intended to be limiting.

Time- and Resource-Sensitive Systems

Resource constraints of mobile phones and other such devices, for example memory and bandwidth, dictate what may be possible on the devices. As these devices become more powerful and battery technology allows for longer life, these constraints may not be so restrictive. However, there is a constant effort to network-enable smaller and smaller devices. In addition, it is likely that the constraints will pass to future devices that may have similar or even greater constraints than the constrained devices of today.

High-transaction throughput systems are sensitive to both bandwidth and processing time. It is possible that Web services, using only XML-based messaging, may not function in this domain. As Moore's law still postulates that machines are getting faster, the rate of increase for machines is significantly slower than that of network bandwidth. More and faster machines may be employed to meet demands for throughput, for example using grid-based concepts. Although this case is compelling, the ability to do more with less, possibly with existing deployed systems, is a significant advantage.

Satellite communications may combine the two previous examples where real-time communication is often required. The tools and technologies of XML-based messaging were recently evaluated for a large European satellite constellation project. The technical support team ruled out XML messaging and its tools because these were not suitable for efficient transfer of data in real time. Instead, they chose to concentrate on tools and technologies that are compliant with WS-Fast.

High-Performance Computing (HPC)

The scientific grid projects represent an area of high-performance computing that is adopting Web services tools and technologies. XML-based messages in these cases may be large and may not represent the data in the most efficient form. For example, large data sets of real numbers may be inefficiently represented and may take time to process. WS-Fast may offer a solution to this very young area and its market without impacting the main goals of grid computing.

Open Mobile Alliance (OMA): Mobile Web Services and Value-Add Service

The OMA is currently defining how non-intermediated Web services can be used for mobile services. Currently, this effort defines the use of value-add services using a Web service framework, for example impromptu teleconferencing and context sensitive applications like "find-a-friend." In the future, the OMA may define how mobile clients may directly connect to value-add services and achieve end-to-end communication. The scale of the number of mobile users and growth in this area means that there may be significant demands on servers to provide unprecedented levels of throughput. WS-Fast may play a critical part to help to achieve this in conjunction with hardware-based throughput computing plans.

WS-Fast

WS-Fast is a standards initiative to solve some of the identified performance problems associated with the existing implementations of the Web service standards. WS-Fast attempts to solve these problems by defining binary-based messages that consume less bandwidth and are faster and more efficient to process.

Figure 11:
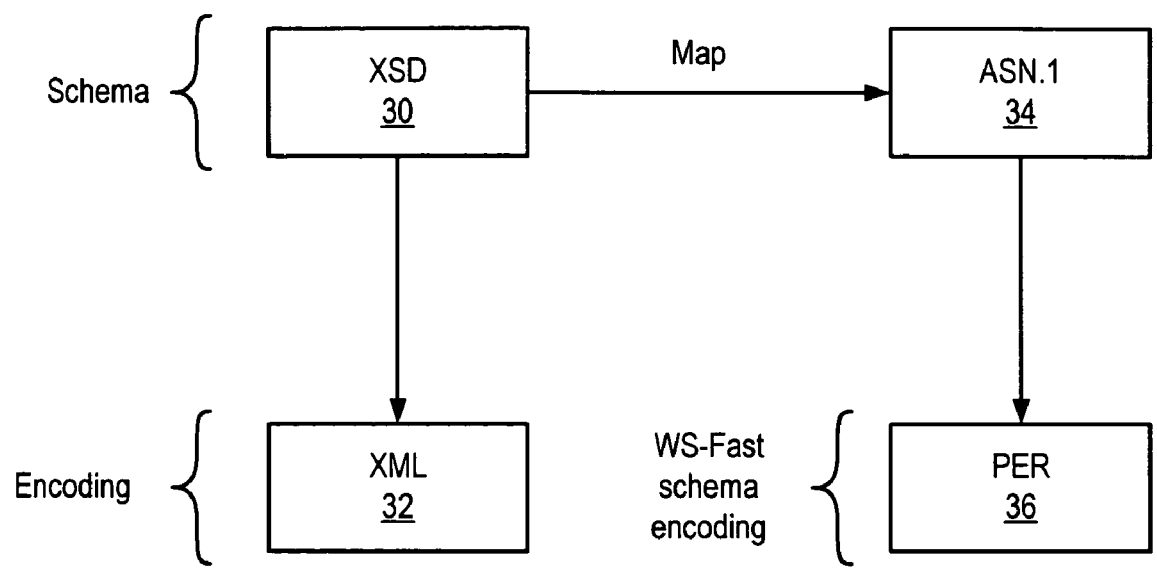
FIG. 11 illustrates mapping from W3C XML Schema to ASN.1 and using an ASN.1 schema to generate a Fast Schema encoding.

The WS-Fast technology may be based on Abstract Syntax Notation One (ASN.1) and a mapping from W3C XML Schema to ASN.1. FIG. 11 illustrates mapping from W3C XML Schema to ASN.1, and using an ASN.1 schema to generate a Fast Schema encoding. An XML schema (XSD 30) may be used to encode XML 32 and/or may be mapped to an ASN.1 schema 34. A Fast Schema encoding (PER 36) may be generated from the ASN.1 schema.

The price for WS-Fast is loss of self-description. WS-Fast is not an attempt to replace XML-based messaging. It is designed to be an alternative that can be used when performance is considered an issue. The main goal of WS-Fast is to enable fast and efficient end-to-end Web services for a whole spectrum of devices, from mobile phones to large back end servers.

WS-Fast is platform-independent, just like existing Web services. This expands the interoperability to Java as well as non-Java platforms, such as C#, C and C++. Standards are crucial: WS-Fast will not be deployed and implemented by vendors unless it has good standards traction backed by parties influential in the Web services area.

WS-Fast may be used to define fast and efficient Web services for a whole spectrum of network devices. A goal of WS-Fast is to minimize the impact to existing specifications and thus minimize the effect on existing Web services developers and tools vendors. WS-Fast is targeted at vendors who develop Web services stacks. With this goal in mind, it is important that WSDL, the basic contract between a client and service, not be changed in any radical fashion. WS-Fast has selected a set of proven network standards and technologies that may ensure that no changes to all three aspects of WSDL are required.

WS-Fast defines the interoperability between WS-Fast peers. In addition, it defines the interoperability with existing deployed Web services that not do not support WS-Fast.

WS-Fast needs to work well with existing Web service standards and APIs so that there is minimal impact to the developers, whatever role a developer may play, such as a tools developer or a designer of a Web service. A developer preferably should not have to maintain two code bases for two different APIs for a Web service, defined using two different Web service contracts.

WS-Fast and the Web Services Stack

A Web services stack processing XML received over a network essentially has three layers: the transport layer, such as HTTP; the XML information set layer, where an XML API is used to access the information set; and a schema binding layer, where XML information items may be bound to programmatic types. Each layer has a mechanism that may be used to improve the performance of XML processing and a unit of 'data' that it operates on. For the transport layer, the mechanism is data compression, and the unit is bytes of data. For the XML information set layer, the mechanism is binary XML representation, and the unit(s) are DOM, SAX, and Pull API. For the schema binding layer, the mechanism is binary data representation, and the unit is programmatic types.

Figure 12A:
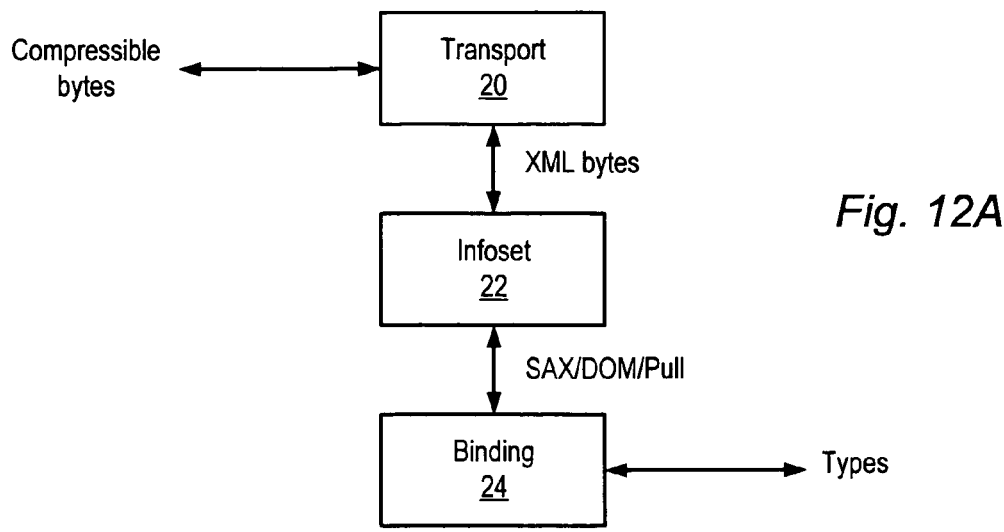
FIG. 12A illustrates a standard pipeline through a Web services stack.

FIG. 12A illustrates a standard pipeline through a Web services stack that may take compressed bytes via a transport 20, decompress them to an XML set of bytes which are then passed to an XML parser where the XML information items are presented using an XML API to the binding layer 24, which converts the XML to types.

Applying compression may have mixed results. Compression generally results in more work done by a sender and receiver if the rate of transfer of information is greater than the time to decompress; i.e., if the bandwidth is there, compression may not help. Compression may help when using low bandwidth links. However, there is still the cost of compressing.

Figure 12B:
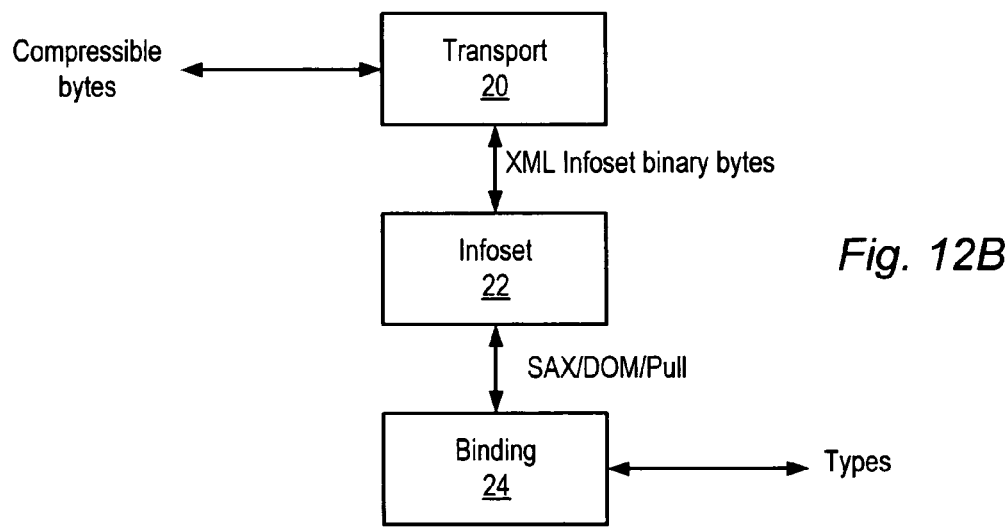
FIG. 12B illustrates a Fast Infoset pipeline through a Web services stack.

In FIG. 12B, a Fast Infoset pipeline replaces XML with a self-describing binary representation of the XML information set where no information is lost. This may help matters; however, the binding layer 24 still needs to do work. If the transport 20 to Infoset 22 layer processing is small compared to the Infoset 22 to binding 24 layer, then this may only give a moderate increase in processing performance.

A Fast Infoset pipeline is good for generic XML processing (e.g. XPath/XSLT) since it preserves the XML information set. The Fast Infoset pipeline can handle xsd:any content. Smaller message sizes can be obtained by using efficient representations (e.g. for integers, Boolean, etc.) and also by clever sharing (e.g. using string tables). In addition, no additional info is needed to decode a Fast Infoset data stream, so there is no loss of self-description.

Figure 12C:
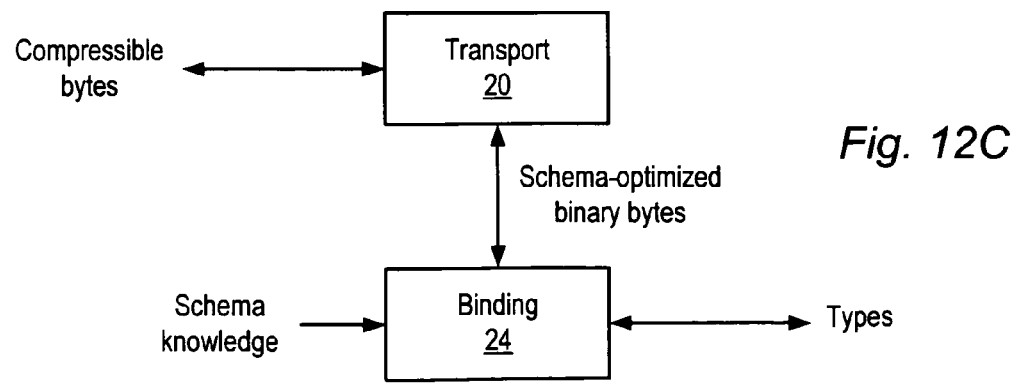
FIG. 12C illustrates a Fast Schema pipeline through a Web services stack.

In FIG. 12C, the Fast Schema pipeline skips the XML information set layer such that the data from the transport layer 20 can be passed directly to the binding layer 24. This represents the most efficient and performant route. The data is encoded in a form that is efficient for the binding layer 24 to process. To encode or decode requires knowledge of the schema. Note that schema knowledge is required by the binding layer 24 regardless of whether Fast Schema encoding or XML encoding is used.

The Fast Schema pipeline requires both parties to know the schema. It cannot be used for generic XML processing unless the schema is known. However, it provides phenomenal performance for Web services. The price to pay is loss of self-description. It is well suited for apps that rely on XML binding tools (e.g. most Web Services tools), as it is possible to fully preserve the application semantics when no XML infoset is exposed at that layer.

Figures 13, 14:
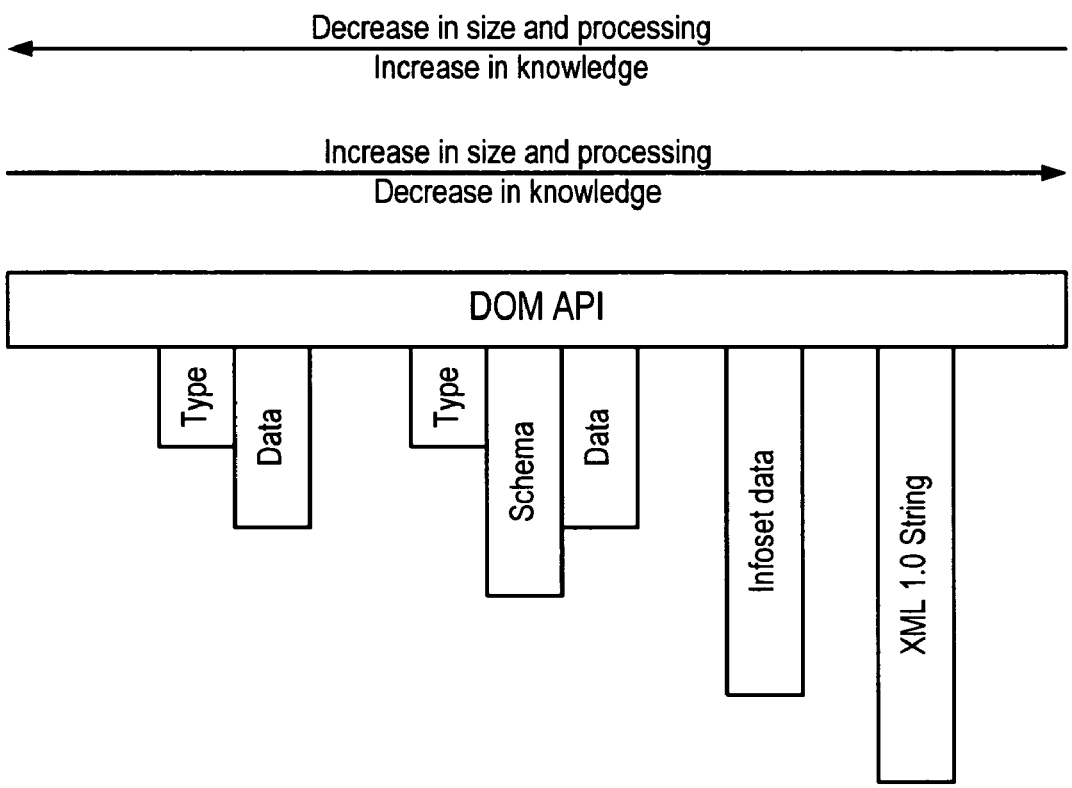
FIG. 13 illustrates exemplary instances of XML and Fast Schema encoding.
FIG. 14 illustrates various forms of content exposed using the DOM API.

FIG. 13 illustrates some exemplary instances of XML and Fast Schema encoding. On the left are the sizes of the respective data in Bytes (B) or bits (b). For the Fast Schema encoded data, the string value is UTF-8 encoded with a length prefix. The integer value is length prefixed and encoded as four Bytes. The Boolean value is encoded as one bit since the length is known.

Note that the Fast Schema encoded data may also be compressed. If the size of the encoded data is less than the XML equivalent, then compression will take less time and may improve on the resulting compressed size of the XML.

Abstract Syntax Notation One (ASN.1)

ASN.1 standards are defined in the International Telecoms Union Telecommunication Standardization sector (ITU-T), and they are jointly defined with ISO. ASN.1 is used extensively in the telecommunications industry. For example, ASN.1 is used in mobile phone networks to help transfer control between network cells. It also plays a critical role in the "central nervous system" of the telephone network when routing data is modified.

ASN.1 is a formal language for abstractly describing messages to be exchanged between distributed computer systems. ASN.1 schema is used to define messages that may be encoded, or represented on the wire, in many different textual or binary forms. Tools may be used to compile the schema into programmatic types such that the encoding/decoding process is automated.

Two initiatives at Study Group 17 (SG-17), the main group chartered to progress ASN.1 until the end of 2004, are:
- To enable ASN.1 schema to be used as an XML Schema, just like W3C XML Schema and Relax-NG. This is referred to as X.693.
- To map W3C XML Schema (XSD) to ASN.1 schema such that ASN.1 tools may be used to encode W3C XML Schema defined data in more efficient binary forms. This is referred to as X.694.

This work is defined under Question 12 (Q12/17) by an ASN.1 sub-group of SG-17. X.693 and X.694 are complete as of 22 Apr. to 1 May 2003 ASN.1 meeting-collaborative with ISO/wEC JTC 1/SC 6 X.660- and X.670-series.

X.694, the mapping of XSD to ASN.1, allows for no modification of the abstract aspects of WSDL, namely the messages defined in an XML schema (as specified by the W3C). Thus, the XML schema referenced in the WSDL document can be thought of as an abstract schema, just like ASN.1, that can be used to encode to XML or an ASN.1 encoding. In this case, a selected ASN.1 encoding could encode the data defined in the schema in an efficient binary form.

Packed Encoding Rules (PER), also referred to as X.691, is a standard defined ASN.1 encoding. ASN.1 schema and PER encoded messages are used in the latest generation of air-ground and ground-ground protocols employed by the Federal Aviation Administration and International Civil Aviation Organization. PER defines the most compact ASN.1 encoding available, and is the fastest encoding to encode and decode to and from, respectively.

WS-Fast and ASN.1

PER may be used in WS-Fast as a compact and efficient-to-process wire format that has already been deployed in wireless networks. Values for such types as integer, Boolean and real are encoded in a compact binary form that is efficient to process. Note that other wire formats than PER may be used.

X.694 and PER (X.691) may provide WS-Fast with a good combination to achieve at least some of its goals. It is important to stress that WS-Fast does not define any new specific binary encoding to XSD. This has already been defined at the ITU-T in a general fashion using a well-established and proven technology under a royalty-free basis. There is no need to invent a new technology. The ASN.1 standards can evolve and progress as future requirements dictate, as they have demonstrably done to embrace the world of XML.

WS-Fast Binding for WSDL

The WS-Fast binding for WSDL represents the core of WS-Fast. The XML schema-defined messages are viewed as abstract schemas that may be encoded as literal XML-based content or, using X.694 and PER, as compact binary-based content. The fundamental difference between the SOAP binding and the WS-Fast binding is that the latter is not based on the XML information set. The PER encoded content is not self-describing; only the data considered necessary is encoded.

The client and service require WSDL to reconstruct the messages, which is not so different from how existing clients and services behave with the SOAP binding, because the WSDL and referenced XML schema are compiled into interfaces defining the method operations and programmatic types which correspond to the method operation parameters. Essentially, WS-Fast is relying on the fact that developers use RPC-based APIs to hide the details and complexities of generating and consuming SOAP-based messages, thus allowing the developer to concentrate on the application. WS-Fast enables a shortcut between the wire format and the binding of method parameters, which skips the XML information set layer.

The SOAP protocol, and therefore the SOAP binding for WSDL, both state that SOAP messages are defined using the XML information set. WS-Fast still utilizes the concepts of SOAP and the SOAP binding for WSDL to ensure minimal change. WS-Fast may provide the following:
- Minimal extension to the SOAP binding for WSDL to state that a service can support a WS-Fast binding
- An ASN.1 schema for the SOAP 1.2 protocol where the semantics of SOAP 1.2, including the SOAP 1.2 processing model and the notion of intermediaries, are preserved.

The WS-Fast binding extension to the SOAP binding may provide the following:
- A client knows that a service can or cannot support WS-Fast, and thus content negotiation of the underlying protocol (if it is supported) is not necessary. Note that content negotiation may be used by WS-Fast clients or services if the WSDL binding is not explicitly stated.
- The SOAP binding for WSDL explicitly states to a WSDL compiler that a compiled stub (client) or tie (server) needs to support the XML and WS-Fast encoding at runtime. One port and thus one interface is required, meaning that a developer will not need to use two ports if the WSDL compiler can support WS-Fast.

WS-Fast requires a distinct media type. If a client or service support the WS-Fast binding in addition to the XML binding, it must be ensured that data in application layer can be represented in either the FAST or XML encoding on the wire.

The WS-Fast binding is part of a set of WS-Fast annotations for WSDL. These annotations include other details such as a definition for use of more efficient ASN.1 identifiers for content if bandwidth is of a major concern. Because WS-Fast is intended to preserve the SOAP 1.2 semantics, the SOAP binding can be annotated with a wsfast:binding element.

An accept attribute value defines what SOAP representations are supported. The attribute contains a list of MIME types that also correspond to what may be supported in the HTTP 1.1 Accept header. In this way, the WS-Fast binding assures that both ASN.1 PER-based SOAP 1.2 and standard XML-based SOAP 1.2 are both supported. The service defines one port, which is connected to the previously presented binding. Thus, only one port is defined that may use the protocol associated with the WS-Fast binding or the SOAP binding.

In WS-Fast, only information that needs to be sent is actually encoded; the element names are not encoded. At least some values, for example integer and Boolean, may be encoded using an efficient binary form. The WS-Fast binding encodes the ASN.1 SOAP envelope in 72 bytes. The SOAP binding encodes the XML SOAP envelope in 272 bytes (without line feeds and white spaces).

ASN.1 Schema for SOAP

The ASN.1 schema for SOAP is a semantic mapping of SOAP 1.2. Where possible, a close correlation has been maintained by explicitly utilizing the X.694 mapping, but there are a few optimizations to increase efficiency:
- Faults are represented explicitly because a SOAP envelope may contain a SOAP body that may only contain SOAP fault.
- Content, header, body, or fault is defined using an ASN.1 OPEN.&Type with an associated id. This id could be qualified name that defines the type of the contents, and this will correspond to the equivalent that would be used as the top-level information element used in the SOAP binding.

Document/Literal and RPC-Literal Operations WSDL 1.1 defined two styles of literal encoding, document/literal and RPC/literal. The former is straightforward to support in WS-Fast because there is a direct correspondence to the schema used and the SOAP body content. The latter is not so straightforward because each parameter is wrapped in an element information item according to the name of the message part, and all the parameters are wrapped around an element information item according to the operation name (with a "Return" appended for a response). No such schema explicitly exists, and this has to be inferred from the WSDL document for the Web service. A pseudo-schema for the input and output of RPC/literal operations may be created by analyzing the WSDL document. The WS-I Basic Profile 1.0 has factored out many issues with WSDL 1.1, including ambiguous order of message parameters on the wire. Thus, it is possible to generate pseudo-schema for a request reliably using a well-defined sequence order, rather than having to rely on using sets, which is problematic when ordering for canonical purposes.

ASN.1 Schema for SOAP Media Type

The MIME media type used to define ASN.1 encoded SOAP envelope values depends on what encoding is used. The PER encoding offers the most benefits and has been explicitly referred to on many occasions, but alternative or new encodings may be used now or in the future respectively. Thus, a set of media types have been defined with the pattern:

application/soap+asn1+<encoding>

The MIME types enable clients, services and intermediaries to identify the WS-Fast and the SOAP binding content unambiguously. Where appropriate, and if the underlying protocol allows for it, SOAP nodes may perform content negotiation.

xsd:any content

Defining what is essentially a "hole" in the schema for any XML content can be problematic for an encoding that requires the schema for efficient encoding and decoding. The X.694 specification currently supports any content assuming that XML is encoded as a UTF-8 string. This somewhat negates the performance advantages that might be available to ASN.1.

There are multiple scenarios that may improve the efficiency of handling general XML content. FIG. 14 illustrates various forms of content exposed using the DOM API, showing different forms of content that have been sent. From right to left, the content reduces in size and may require less processing to expose as a DOM API. From left to right, the content increases and may require more processing.

The forms of content that may be transmitted, from left to right, are:

Typed data, as has been described previously for the sending of content in a SOAP message. It is assumed that the receiver knows the type such that it can associate the data with a schema to be decoded. If the type is a qualified name, a schema may be obtained for the type, given the URI part.

Typed data with schema. If the schema is not known, it can be sent with the typed data. This could be an efficient representation of the schema: for example, with respect to W3C's XML schema it could be an instance of the schema used to define an XML schema after it has been encoded using WS-Fast.

Infoset data.

XML 1.0 String, which is encoded as UTF-8.

If schemas are not available, then only the latter two options may be used. Using a binary representation of the information set will be more efficient.

If schemas are available, then a mechanism to encode the schemas or to enable dereferencing of a type to the schemas is required. In addition, the data must be mapped to the appropriate data representation that the DOM requires. This implies obtaining element and attribute names from the schema and also converting binary encoded types, such as integers, back to strings. This could increase the processing required, at the advantage of smaller size. In this respect, the binary information set representation may well offer the best overall solution, if DOM-based APIs are used.

ASN.1 Schema for the XML Information Set

An ASN.1 schema for the XML information set may be closely aligned to the XML information set, but also allows for optimizations such that repeating string data associated with repeating elements, attributes, text content and namespaces may be shared, thus reducing the size of XML-based messages.

String data may be defined in tables, before or after the information data, or dynamically in the information data. The former approach allows for ease of table generation or ease of information data processing by the serializer and deserializer, respectively. The latter approach allows for streaming of information data by a serializer and deserializer because neither needs to process all the data before a string table can be generated or processed.

This makes the representation of the XML information ideally suitable for supporting the xsd:any content because a mapped ASN.1 type may have a value that corresponds to an ASN.1 Infoset fragment type. The whole "document" may then be encoded consistently using one ASN.1 encoding rule.

Security and WS-Fast

Web services security, defined using SOAP headers, represents a significant issue for WS-Fast. WS-Security relies on the ability to manipulate the contents of a SOAP body using the XML information set. For example, a nested credit card element may be signed and encrypted using an XPath expression.

WS-Fast can support only very simple security mechanisms for the signing and encrypting of the header, body or fault content. PER encoding has a canonical form, which for the most part is the same as the non-canonical form; 99% of the time normal PER is canonical. In general, WS-Fast can offer simpler security policies using simpler, well-proven canonical encodings.

If signing and encryption of sub-elements of a message are considered important and are meant to apply externally to the SOAP envelope, then it may be necessary to define what needs to be signed and encrypted at the level of the schema, otherwise encryption will result in well-formed but invalid documents. If this is the case, then WS-Fast may be able to handle explicit nestings.

Interoperability

A specific goal of WS-Fast is to ensure interoperability with existing peers that communicate using XML. WS-Fast interoperability issues may occur because WS-Fast is not self-describing and thus not a representation of the XML information set. WS-Fast is not designed to replace XML; the choice between the two depends on whether performance is a concern and whether WS-Fast will address this concern.

The nature of interoperability between WS-Fast peers should also be clearly stated. Mechanisms to define the WS-Fast capability of a peer may include the WSDL contract and the MIME media type. These mechanisms may be used to ensure WS-Fast and XML communication, and transcoding between the two.

Application Layer to WS-Fast Binding

Client, services, intermediaries, and in general peers, cannot assume how each component binds the encoded data on the wire into the representation exposed to the application. For example, a client may have bound WSDL message parts to programmatic types, a service of the WSDL may have bound the same message parts to a DOM node fragment. This choice is not, and should not be, defined in the WSDL because the port type (operations and messages) is abstract. The choice may be one made by the developer or could be because the binding tools used do not support some required features (as is the case for some XSD binding tools).

If a WS-Fast binding to WSDL is stated, which implies that the SOAP binding is supported (using the accepted MIME types), then these to conditions must be noted:

A service implementation of the WS-Fast and SOAP port must ensure that the application layer can be supported for both protocols, and the application cannot affect the protocol that can be used.

A client implementation, if it supports the WS-Fast and SOAP binding (and the client has the potential to only support one), must ensure that the application layer can be supported for both protocols, and the application cannot affect the protocol that can be used.

The generality of these statements is intended to cover the case in which a developer chooses to expose a message part as a DOM node. With respect to WS-Fast, if the message part was not defined to be an xsd:any type, then this requires that the specified schema be converted to and from WS-Fast encoding. If this is supported for the SOAP binding but not for the WS-Fast binding, then a dual binding cannot be supported. If a SOAP binding must migrate to include a WS-Fast binding, then the application may have to change in order to accommodate the requirement.

Intermediaries and Header Processing

Intermediaries and header processing represent areas where the WSDL contract is not known or the where the header elements are not defined in the WSDL, respectively. Intermediaries are a core concept of the SOAP processing model, and headers provide the extensibility mechanism of SOAP. Intermediaries may process SOAP headers, add new ones, or modify the SOAP body content.

Header processing is based on meaningful access to header data defined with an identifier, such as a top-level qualified name. For example, an intermediary that must route a SOAP message based on a routing header must understand the routing information, whether this is encoded as XML or WS-Fast. Thus, intermediaries can bind header information that must be understood to programmatic types for both the SOAP and WS-Fast protocol. Note that it also possible to bind WS-Fast encoded data to an XML Infoset representation (DOM Node.

Protocol/Content Negotiation

A client may know that a service knows that a certain port can support SOAP and WS-Fast because the WSDL document may state this. Thus, a client can choose what binding and which protocol to use in the knowledge that the service will accept an error-free message.

Intermediaries are different. For example, a route from A to C may involve intermediary B that cannot support the WS-Fast protocol. A or C may not be aware of B, or A and C may be aware of B but not each other, because the address of the port may or may not represent the actual endpoint of the service. If A and C support the WS-Fast and SOAP protocol and B only the SOAP protocol, then content/protocol negotiation needs to be used to ensure that the SOAP protocol is used by A.

If HTTP transport is used, then HTTP agent-driven content negotiation may be employed. Although WS-Fast and SOAP are considered separate protocols, from the transport perspective they may be considered different representations, which are defined using different MIME media types. A may send a message to the HTTP port address using the WS-Fast protocol on the understanding that the service deployed at C can support the WS-Fast protocol (given the WSDL contract). B will reject the message based on the MIME type and will inform A that it can accept only SOAP protocol representations (XML). A will then send the same message using the SOAP protocol representation. In this scenario, A requires two attempts to enable communication: request, reject, request.

Another scenario may occur if the WSDL contract does not state that a WS-Fast binding is supported but the transport protocol via a response states that a port can indeed support WS-Fast binding. Thus, WS-Fast communication may occur on the second client request.

An additional scenario occurs when a client states what it can support in the transport protocol, thus allowing the receiver to choose what to return based on its capabilities and the sender's preferences. For example, a client may send a message using the SOAP protocol and receive a message using the WS-Fast protocol.

Transcoding Using SOAP Intermediaries

Transcoding is a process performed by intermediaries in which SOAP messages may be converted to a format suitable for processing by a receiving node. For example, node A supports the WS-Fast protocol but node C only supports the SOAP protocol. In this case, intermediary node B may transcode the WS-Fast protocol to and from the SOAP protocol so that A can communicate with C.

For an intermediary to convert the WS-Fast-encoded data to XML, and the reverse, the schema for the data needs to be known. If the namespace of the qualified name, e.g. a URI or URN, can be resolved to obtain the schema, then it is possible for a transcoding intermediary to build a cache of encoders dynamically. In addition, the intermediary must be prepared to process the WSDL contract obtained from resolving the namespace, such that a pseudo-schema for RPC/literal operations can be generated as well as obtaining schema contained within the WSDL messages.

An intermediary may be generally considered a node that does not understand application-specific data, but there is no particular reason why this has to be the case, and transcoding is one example. WS-Fast transcoding does require dereferencing URIs or URNs that may or may not be accessible, which can render transcoding intermediaries brittle. In addition, "hub" intermediaries with many different applications passing through will need to scale.

Further issues arise when transcoding results in loss of data, such as namespace prefixes, or when there are dependencies on the wire data, such as signatures. If a signature is generated from the bytes on the wire and these bytes are transcoded, then the signature needs to be regenerated. Because ASN.1 defines information abstractly, it is possible to produce a signature using one encoding, such as DER, while using another encoding for transmission, such as PER. However, this may not aid a node that only understands the SOAP protocol and does not have any ASN.1 capabilities, in addition to impeding performance.

Where possible, WS-Fast end-to-end communication may be desirable. Intermediaries do not need to understand the application specific message content or its structure and can instead concentrate on the general headers that they must understand.

Schema Drift

Schema versioning is recognized as a difficult problem, and it is believed that schema drift will become more likely as the scale of Web services increases, and developers may not employ an appropriate versioning policy.

Because of its self-describing nature, XML has the potential to be more robust in the face of schema drift than binary protocols such as CORBA, but XML is not in itself a panacea; important data for the application that is missing and defaults to an initial application-specific value or relies on interdependencies between other data or assumes predefined order may result in incorrect processing that propagates through the system or a results in a performance penalty. Thus, although it may be possible to automate some aspects of drift—validation is no longer exact because the rule 'be liberal in what you expect' is followed—the applications may need to be prepared, which may impede developers because Web service API and tools are designed to shield XML from the developer.

ASN.1 has been deployed successfully while allowing for schema evolution because extensibility is designed upfront. Binary encodings, such as PER, length prefix the extension data such that earlier versions can skip this information. New versions may choose to ignore all or none of the data before the extension data as-defined, and thus data is not removed or modified, but is simply added to.

X.694 does not allow the ASN.1 extension mechanism to be used because there is nothing equivalent in the W3C's XML schema specification. This makes schema drift for WS-Fast a much more serious problem because the decoding of data may be misconstrued. WS-Fast needs to identify that drift has occurred, and because decoding cannot be performed, must fall back to using XML and the SOAP protocol, although this still might not be enough because the drift could be too much.

A mechanism that fingerprints WS-Fast content using an MD5 hash may be used. The fingerprint is generated from the ASN.1 types and properties whose values are encoded on the wire and depend on PER because it takes account of PER visible constraints.

Due to the PER encoding, WS-Fast has a mechanism for schema drift robustness. Changing an element or attribute information item name may occur to represent better what type of information it encapsulates. In XML, these effects result in something being removed and something being added. For WS-Fast, the fingerprint will not be affected because only the non-redundant data is considered important.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a client comprising a client Web services stack that supports both a markup language protocol and a binary encoding protocol, wherein the markup language protocol is based on XML (eXtensible Markup Language); and
    a server comprising a server Web services stack that supports both the markup language protocol and the binary encoding protocol, wherein the server Web services stack is configured to:
        communicate with the client Web services stack according to the markup language protocol; and
        dynamically switch to communicate with the client Web services stack according to the binary encoding protocol, wherein communication according to the binary encoding protocol comprises mapping from an XML schema to a binary encoding schema and generating a binary encoding from the binary encoding schema;
    wherein the client Web services stack and the server Web services stack each support the markup language protocol and the binary encoding protocol with a single API (application programming interface).

2. The system as recited in claim 1, wherein the client is a JAX-RPC (Java API for XML (eXtensible Markup Language)-based RPC (Remote Procedure Call)) client.

3. The system as recited in claim 1, wherein the client is a J2ME (Java 2 Micro Edition) client.

4. The system as recited in claim 1, wherein the server is a JAX-RPC (Java API for XML (eXtensible Markup Language)-based RPC (Remote Procedure Call)) server.

5. The system as recited in claim 1, wherein the binary encoding schema is an ASN.1(Abstract Syntax Notation One) schema.

6. The system as recited in claim 1, wherein the binary encoding protocol uses Packed Encoding Rules (PER) encoding.

7. The system as recited in claim 1, further comprising another client comprising another client Web services stack that supports only the binary encoding protocol, and wherein the server Web services stack is further configured to communicate with the other client Web services stack according to the binary encoding protocol.

8. The system as recited in claim 1, wherein, to communicate with the client Web services stack according to the binary encoding protocol, the server Web services stack is further configured to:
    translate the markup language protocol to binary encoding protocol messages for transmission to the client Web services stack; and
    translate binary encoding protocol messages received from the client Web services stack to the markup language protocol.

9. The system as recited in claim 1, wherein, to communicate with the client Web services stack according to the binary encoding protocol, the server Web services stack is further configured to serialize the markup language protocol to generate binary encoding protocol messages according to a self-describing binary format that preserves the markup language protocol information set.

10. The system as recited in claim 1, wherein, to communicate with the client Web services stack according to the binary encoding protocol, the server Web services stack is further configured to serialize the markup language protocol to generate binary encoding protocol messages according to a schema-optimized binary format for transmitting data described by markup language schema.

11. A system, comprising:
a processor; and
a memory comprising program instructions, wherein the program instructions are executable by the processor to implement a Web services stack configured to:
communicate with another Web services stack on another system according to a markup language protocol, wherein the markup language protocol is based on XML (eXtensible Markup Language); and
dynamically switch to communicate with the other Web services stack according to the binary encoding protocol, wherein communication according to the binary encoding protocol comprises mapping from an XML schema to a binary encoding schema and generating a binary encoding from the binary encoding schema;
wherein the Web services stack supports the markup language protocol and the binary encoding protocol with a single API (application programming interface).

12. The system as recited in claim 11, wherein the system is a JAX-RPC (Java API for XML (eXtensible Markup Language)-based RPC (Remote Procedure Call)) client.

13. The system as recited in claim 11, wherein the system is a J2ME (Java 2 Micro Edition) client.

14. The system as recited in claim 11, wherein the system is a JAX-RPC (Java API for XML (eXtensible Markup Language)-based RPC (Remote Procedure Call)) server.

15. The system as recited in claim 11, wherein the system and the other system are peers on a network.

16. The system as recited in claim 11, wherein the binary encoding schema is an ASN.1(Abstract Syntax Notation One) schema.

17. The system as recited in claim 11, wherein the binary encoding protocol uses Packed Encoding Rules (PER) encoding.

18. The system as recited in claim 11, wherein, to communicate with the other Web services stack according to the binary encoding protocol, the Web services stack is further configured to:
translate the markup language protocol to binary encoding protocol messages for transmission to the other Web services stack; and
translate binary encoding protocol messages received from the other Web services stack to the markup language protocol.

19. The system as recited in claim 11, wherein, to communicate with the other Web services stack according to the binary encoding protocol, the Web services stack is further configured to serialize the markup language protocol to generate binary encoding protocol messages according to a self-describing binary format that preserves the markup language protocol information set.

20. The system as recited in claim 11, wherein, to communicate with the other Web services stack according to the binary encoding protocol, the Web services stack is further configured to serialize the markup language protocol to generate binary encoding protocol messages according to a schema-optimized binary format for transmitting data described by markup language schema.

21. A system, comprising:
a client system, server system, or peer device comprising:
means for communicating between a Web services stack on the system and another Web services stack on another system according to a markup language protocol, wherein the markup language protocol is based on XML (eXtensible Markup Language); and
means for dynamically switching to communicate between the Web services stack and the other Web services stack according to a binary encoding protocol, wherein communication according to the binary encoding protocol comprises mapping from an XML schema to a binary encoding schema and generating a binary encoding from the binary encoding schema;
wherein the Web services stack supports the markup language protocol and the binary encoding protocol with a single API (application programming interface).

22. The system as recited in claim 21, wherein the binary encoding schema is an ASN.1 (Abstract Syntax Notation One) schema.

23. The system as recited in claim 22, wherein the binary encoding protocol uses Packed Encoding Rules (PER) encoding.

24. A method, comprising:
a Web services stack communicating with another Web services stack according to a markup language protocol, wherein the markup language protocol is based on XML (eXtensible Markup Language); and
the Web services stack dynamically switching to communicating with the other Web services stack according to a binary encoding protocol, wherein communication according to the binary encoding protocol comprises mapping from an XML schema to a binary encoding schema and generating a binary encoding from the binary encoding schema;
wherein the Web services stack supports the markup language protocol and the binary encoding protocol with a single API (application programming interface).

25. The method as recited in claim 24, wherein the Web services stack is implemented on a JAX-RPC (Java API for XML (eXtensible Markup Language)-based RPC (Remote Procedure Call)) client system.

26. The method as recited in claim 24, wherein the Web services stack is implemented on a J2ME (Java 2 Micro Edition) client system.

27. The method as recited in claim 24, wherein the Web services stack is implemented on a JAX-RPC (Java API for XML (eXtensible Markup Language)-based RPC (Remote Procedure Call)) server system.

28. The method as recited in claim 24, wherein the Web services stack and the other Web services stack are implemented on peers on a network.

29. The method as recited in claim 24, wherein the binary encoding schema is an ASN.1(Abstract Syntax Notation One) schema.

30. The method as recited in claim 24, wherein the binary encoding protocol uses Packed Encoding Rules (PER) encoding.

31. The method as recited in claim 24, wherein said communicating with the other Web services stack according to the binary encoding protocol comprises:

translating the markup language protocol to binary encoding protocol messages for transmission to the other Web services stack; and translating binary encoding protocol messages received from the other Web services stack to the markup language protocol.

32. The method as recited in claim 24, wherein said communicating with the other Web services stack according to the binary encoding protocol comprises serializing the markup language protocol to generate binary encoding protocol messages according to a self-describing binary format that preserves the markup language protocol information set.

33. The method as recited in claim 24, wherein said communicating with the other Web services stack according to the binary encoding protocol comprises serializing the markup language protocol to generate binary encoding protocol messages according to a schema-optimized binary format for transmitting data described by markup language schema.

34. A computer-accessible storage medium comprising program instructions, wherein the program instructions are configured to implement:

a Web services stack communicating with another Web services stack according to a markup language protocol, wherein the markup language protocol is based on XML (eXtensible Markup Language); and the Web services stack dynamically switching to communicating with the other Web services stack according to a binary encoding protocol wherein communication according to the binary encoding protocol comprises mapping from an XML schema to a binary encoding schema and generating a binary encoding from the binary encoding schema;

wherein the Web services stack supports the markup language protocol and the binary encoding protocol with a single API (application programming interface).

35. The computer-accessible storage medium as recited in claim 34, wherein the Web services stack is implemented on a JAX-RPC (Java API for XML (eXtensible Markup Language)-based RPC (Remote Procedure Call)) client system.

36. The computer-accessible storage medium as recited in claim 34, wherein the Web services stack is implemented on a J2ME (Java 2 Micro Edition) client system.

37. The computer-accessible storage medium as recited in claim 34, wherein the Web services stack is implemented on a JAX-RPC (Java API for XML (eXtensible Markup Language)-based RPC (Remote Procedure Call)) server system.

38. The computer-accessible storage medium as recited in claim 34, wherein the Web services stack and the other Web services stack are implemented on peers on a network.

39. The computer-accessible storage medium as recited in claim 34, wherein the binary encoding schema is an ASN.1 (Abstract Syntax Notation One) schema.

40. The computer-accessible storage medium as recited in claim 34, wherein the binary encoding protocol uses Packed Encoding Rules (PER) encoding.

41. The computer-accessible storage medium as recited in claim 34, wherein, in said communicating with the other Web services stack according to the binary encoding protocol, the program instructions are further configured to implement:

translating the markup language protocol to binary encoding protocol messages for transmission to the other Web services stack; and translating binary encoding protocol messages received from the other Web services stack to the markup language protocol.

42. The computer-accessible storage medium as recited in claim 34, wherein, in said communicating with the other Web services stack according to the binary encoding protocol, the program instructions are further configured to implement serializing the markup language protocol to generate binary encoding protocol messages according to a self-describing binary format that preserves the markup language protocol information set.

43. The computer-accessible storage medium as recited in claim 34, wherein, in said communicating with the other Web services stack according to the binary encoding protocol, the program instructions are further configured to implement serializing the markup language protocol to generate binary encoding protocol messages according to a schema-optimized binary format for transmitting data described by markup language schema.

44. A system, comprising:

a processor; and a memory comprising program instructions, wherein the program instructions are executable by the processor to implement a Web services stack configured to:

communicate with other systems using either a binary encoding protocol or a markup language protocol using a single API (application programming interface), wherein the markup language protocol is based on XML (eXtensible Markup Language), and wherein communication according to the binary encoding protocol comprises mapping from an XML schema to a binary encoding schema and generating a binary encoding from the binary encoding schema;

negotiate with another system to determine if the other system supports the binary encoding protocol;

if the other system supports the binary encoding protocol, communicate with the other system according to the binary encoding protocol; and if the other system does not support the binary encoding protocol, communicate with the other system according to the markup language protocol.

45. The system as recited in claim 44, wherein the system is a JAX-RPC (Java API for XML (eXtensible Markup Language)-based RPC (Remote Procedure Call)) server.

46. The system as recited in claim 44, wherein the system and the other system are peers on a network.

47. The system as recited in claim 44, wherein the binary encoding schema is an ASN.1 (Abstract Syntax Notation One) schema.

48. The system as recited in claim 44, wherein the binary encoding protocol uses Packed Encoding Rules (PER) encoding.

49. The system as recited in claim 44, wherein the Web services stack is further configured to, if the other system includes a Web services stack configured to communicate with either the binary encoding protocol or the markup language protocol:

communicate with the other system according to the markup language protocol; and dynamically switch to communicate with the other system according to the binary encoding protocol.

50. The system as recited in claim 44, wherein, to communicate with the other system according to the binary encoding protocol, the Web services stack is further configured to serialize the markup language protocol to generate binary encoding protocol messages according to a self-describing binary format that preserves the markup language protocol information set.

51. The system as recited in claim 44, wherein, to communicate with the other system according to the binary encoding protocol, the Web services stack is further configured to serialize the markup language protocol to generate binary encoding protocol messages according to a schema-optimized binary format for transmitting data described by markup language schema.

52. A system, comprising:
a client system, server system, or peer device comprising:
means for communicating with other systems using either a binary encoding protocol or a markup language protocol using a single API (application programming interface), wherein the markup language protocol is based on XML (eXtensible Markup Language), and wherein communication according to the binary encoding protocol comprises mapping from an XML schema to a binary encoding schema and generating a binary encoding from the binary encoding schema;
means for negotiating with another system to determine if the other system supports the binary encoding protocol; and
means for communicating with the other system according to the binary encoding protocol if the other system supports the binary encoding protocol.

53. The system as recited in claim 52, wherein the binary encoding schema is an ASN.1(Abstract Syntax Notation One) schema.

54. The system as recited in claim 52, wherein the binary encoding protocol uses Packed Encoding Rules (PER) encoding.

55. A method, comprising:
a Web services stack on a system configured to communicate with other systems using either a binary encoding protocol or a markup language protocol using a single API (application programming interface) negotiating with another system to determine if the other system supports the binary encoding protocol, wherein the markup language protocol is based on XML (eXtensible Markup Language), and wherein communication according to the binary encoding protocol comprises mapping from an XML schema to a binary encoding schema and generating a binary encoding from the binary encoding schema;
if the other system supports the binary encoding protocol, the Web services stack communicating with the other system according to the binary encoding protocol; and
if the other system does not support the binary encoding protocol, the Web services stack communicating with the other system according to the markup language protocol.

56. The method as recited in claim 55, wherein the system is a JAX-RPC (Java API for XML (eXtensible Markup Language)-based RPC (Remote Procedure Call)) server.

57. The method as recited in claim 55, wherein the system and the other system are peers on a network.

58. The method as recited in claim 55, wherein the binary encoding schema is an ASN.1(Abstract Syntax Notation One) schema.

59. The method as recited in claim 55, wherein the binary encoding protocol uses Packed Encoding Rules (PER) encoding.

60. The method as recited in claim 55, further comprising, if the other system includes a Web services stack configured to communicate with either the binary encoding protocol or the markup language protocol:
communicating with the other system according to the markup language protocol; and
dynamically switching to communicating with the other system according to the binary encoding protocol.

61. The method as recited in claim 55, wherein said communicating with the other system according to the binary encoding protocol comprises serializing the markup language protocol to generate binary encoding protocol messages according to a self-describing binary format that preserves the markup language protocol information set.

62. The method as recited in claim 55, wherein said communicating with the other system according to the binary encoding protocol comprises serializing the markup language protocol to generate binary encoding protocol messages according to a schema-optimized binary format for transmitting data described by markup language schema.

63. A computer-accessible storage medium comprising program instructions, wherein the program instructions are configured to implement:
a Web services stack on a system configured to communicate with other systems using either a binary encoding protocol or a markup language protocol using a single API (application programming interface) negotiating with another system to determine if the other system supports the binary encoding protocol, wherein the markup language protocol is based on XML (eXtensible Markup Language), and wherein communication according to the binary encoding protocol comprises mapping from an XML schema to a binary encoding schema and generating a binary encoding from the binary encoding schema;
if the other system supports the binary encoding protocol, the Web services stack communicating with the other system according to the binary encoding protocol; and
if the other system does not support the binary encoding protocol, the Web services stack communicating with the other system according to the markup language protocol.

64. The computer-accessible storage medium as recited in claim 63, wherein the system is a JAX-RPC (Java API for XML (eXtensible Markup Language)-based RPC (Remote Procedure Call)) server.

65. The computer-accessible storage medium as recited in claim 63, wherein the system and the other system are peers on a network.

66. The computer-accessible storage medium as recited in claim 63, wherein the binary encoding schema is an ASN.1 (Abstract Syntax Notation One) schema.

67. The computer-accessible storage medium as recited in claim 63, wherein the binary encoding protocol uses Packed Encoding Rules (PER) encoding.

68. The computer-accessible storage medium as recited in claim 63, wherein the program instructions are further configured to implement, if the other system includes a Web services stack configured to communicate with either the binary encoding protocol or the markup language protocol:
communicating with the other system according to the markup language protocol; and
dynamically switching to communicating with the other system according to the binary encoding protocol.

69. The computer-accessible storage medium as recited in claim 63, wherein, in said communicating with the other system according to the binary encoding protocol, the program instructions are further configured to implement serializing the markup language protocol to generate binary encoding protocol messages according to a self-describing binary format that preserves the markup language protocol information set.

70. The computer-accessible storage medium as recited in claim 63, wherein, in said communicating with the other system according to the binary encoding protocol, the program instructions are further configured to implement serializing the markup language protocol to generate binary encoding protocol messages according to a schema-optimized binary format for transmitting data described by markup language schema.

* * * * *

UNITED STATES PATENT AND TRADEMARK OFFICE
CERTIFICATE OF CORRECTION

PATENT NO. : 7,647,415 B1  Page 1 of 1
APPLICATION NO. : 10/787007
DATED : January 12, 2010
INVENTOR(S) : Sandoz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1710 days.

Signed and Sealed this

Sixteenth Day of November, 2010

David J. Kappos
*Director of the United States Patent and Trademark Office*